US011539819B2

(12) United States Patent
Amicangioli et al.

(10) Patent No.: US 11,539,819 B2
(45) Date of Patent: *Dec. 27, 2022

(54) DYNAMIC TCP STREAM PROCESSING WITH MODIFICATION NOTIFICATION

(71) Applicant: Hyannis Port Research, Inc., Needham, MA (US)

(72) Inventors: Anthony D. Amicangioli, Newton, MA (US); Andrew C. Carp, Cambridge, MA (US); Timothy G. Field, Tyngsboro, MA (US); Dominick S. Grochowina, Cambridge, MA (US); Yura Pyatnychko, Watertown, MA (US); Bernard J. Rosen, Westford, MA (US)

(73) Assignee: Hyannis Port Research, Inc., Needham, MA (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/037,857

(22) Filed: Sep. 30, 2020

(65) Prior Publication Data
US 2021/0084127 A1 Mar. 18, 2021

Related U.S. Application Data

(63) Continuation of application No. 16/002,148, filed on Jun. 7, 2018, now Pat. No. 10,805,434.
(Continued)

(51) Int. Cl.
*H04L 29/06* (2006.01)
*G06Q 40/04* (2012.01)
(Continued)

(52) U.S. Cl.
CPC ............. *H04L 69/22* (2013.01); *G06Q 40/04* (2013.01); *H04L 1/08* (2013.01); *H04L 47/34* (2013.01)

(58) Field of Classification Search
CPC ..... H04L 63/0414; H04L 47/34; H04L 69/22; H04L 1/08; H04L 1/1642; H04L 63/0245; G06Q 40/04
See application file for complete search history.

(56) References Cited

U.S. PATENT DOCUMENTS 6,341,127 B1 1/2002 Katsube et al.
6,473,425 B1 10/2002 Bellaton et al.
(Continued)

FOREIGN PATENT DOCUMENTS

AU 2018280156 A1 12/2019
CA 3065804 A1 12/2018
(Continued)

OTHER PUBLICATIONS

Guha, et. al in "Characterization and Measurement of TCP Traversal through NATs and Firewalls," Usenix Internet Measurement Conference, Cornell University, 199-211 (2005).
(Continued)

*Primary Examiner* — Brian D Nguyen
(74) *Attorney, Agent, or Firm* — VLP Law Group LLP; David J. Thibodeau, Jr.

(57) ABSTRACT

Techniques for content inspection in a communication network, including detecting a packet in transit between a first and second endpoint, determining that content of the packet fails a content check, modifying a payload containing the content, adjusting a sequence number to account for the modification, and injecting a response message into a corresponding stream in an opposite direction. The response message may contain information relating to a reason for the rejection.

29 Claims, 14 Drawing Sheets

Related U.S. Application Data

(60) Provisional application No. 62/516,753, filed on Jun. 8, 2017.

(51) Int. Cl.
  *H04L 1/08* (2006.01)
  *H04L 12/801* (2013.01)
  *H04L 69/22* (2022.01)
  *H04L 47/34* (2022.01)

(56) References Cited

U.S. PATENT DOCUMENTS

| | | |
|---|---|---|
| 6,907,042 B1 | 6/2005 | Oguchi |
| 6,970,962 B2 | 11/2005 | Dieffenderfer et al. |
| 6,975,647 B2 | 12/2005 | Neale et al. |
| 7,116,634 B1 | 10/2006 | Hanselmann |
| 7,152,124 B1 | 12/2006 | Puri et al. |
| 7,237,036 B2 | 6/2007 | Boucher et al. |
| 7,277,963 B2 | 10/2007 | Dolson et al. |
| 7,486,678 B1 | 2/2009 | DeVanagondi et al. |
| 7,512,144 B2 | 3/2009 | Fan |
| 7,826,457 B2 | 11/2010 | Bennett et al. |
| 7,826,487 B1 | 11/2010 | Mukerji et al. |
| 8,363,544 B2 | 1/2013 | Fishteyn et al. |
| 8,363,549 B1 | 1/2013 | Shu et al. |
| 8,583,053 B1 | 11/2013 | Mahbod et al. |
| 9,607,337 B2 | 3/2017 | Amicangioli |
| 9,706,004 B2* | 7/2017 | Mylarappa .......... H04L 67/2819 |
| 10,805,434 B2 | 10/2020 | Amicangioli et al. |
| 10,873,613 B2* | 12/2020 | Pope .................... H04L 69/161 |
| 2009/0228971 A1 | 9/2009 | Samuels et al. |
| 2011/0276699 A1 | 11/2011 | Perdersen |
| 2012/0166327 A1 | 6/2012 | Amicangioli |
| 2012/0182859 A1 | 7/2012 | Ikeda et al. |
| 2012/0324056 A1 | 12/2012 | Miles |
| 2012/0327779 A1 | 12/2012 | Gell et al. |
| 2013/0263245 A1 | 10/2013 | Sun et al. |
| 2014/0140342 A1 | 5/2014 | Narad et al. |
| 2015/0249604 A1 | 9/2015 | Folsom et al. |
| 2016/0105469 A1 | 4/2016 | Galloway et al. |
| 2016/0366160 A1* | 12/2016 | Kapoor ............... G06F 16/2358 |
| 2017/0085500 A1* | 3/2017 | Patney .................. H04W 80/06 |
| 2017/0093796 A1 | 3/2017 | Wang et al. |
| 2017/0264546 A1* | 9/2017 | Agarwal ................ H04L 47/12 |
| 2017/0272373 A1 | 9/2017 | Chau |
| 2018/0176816 A1 | 6/2018 | Meylan et al. |
| 2018/0227798 A1 | 8/2018 | Hecht et al. |
| 2018/0262420 A1 | 9/2018 | Jaffer et al. |
| 2018/0262434 A1 | 9/2018 | Koponen et al. |
| 2018/0278588 A1 | 9/2018 | Cela et al. |
| 2018/0331914 A1 | 11/2018 | Yoshida et al. |
| 2019/0289620 A1 | 9/2019 | Zhang et al. |
| 2019/0379768 A1 | 12/2019 | Amicangioli et al. |
| 2020/0021514 A1* | 1/2020 | Michael ................ H04L 45/745 |
| 2020/0021515 A1* | 1/2020 | Michael ................ H04L 45/24 |

FOREIGN PATENT DOCUMENTS

| | | |
|---|---|---|
| CN | 105144660 A | 12/2015 |
| CN | 110999221 A | 4/2020 |
| EP | 0595552 A2 | 10/1996 |
| EP | 3635916 A1 | 4/2020 |
| JP | 2020-523950 A | 8/2020 |
| WO | 2018/226919 A1 | 12/2018 |

OTHER PUBLICATIONS

Turcanik, "Packet Filtering by Artificial Neural Network", Conference Paper, Research Gate DOI: 10.1109/MILTECHS (2015).
https://supportforums.cisco.com/t5/email-security/looking-to-add-a-notification-template-to-sender-on-a-message/td-p/2960157, no date.
Sathiaseelan et al., "Improving the Performance of TCP in the Case of Packet Reordering," Department of Computer Science, King's College London, no date.
Alvisi, L., et al., "Wrapping server-side TCP to mask connection failures," Proceedings IEEE INFOCOM 2001, Twentieth Annual Joint Conference of the IEEE Computer and Communications Society, 22-26(1), 329-337 (2001).
International Search Report and Written Opinion dated Aug. 31, 2018 for Related PCT/US2018/036395.
Extended European Search Report dated Nov. 9, 2020 for Related EP Appl. No. 18812779.9.
Examination Report received for Australian Patent Application No. 2018280156, dated Apr. 18, 2022, 4 pages.
Office Action received for Chinese Patent Application No. 201880051533.9, datedn Mar. 2, 2022, 18 pages (11 pages of English Translation and 7 pages of Original Document).

* cited by examiner

DYNAMIC TCP STREAM PROCESSING WITH MODIFICATION NOTIFICATION

CROSS REFERENCE TO RELATED APPLICATION(S)

This application claims priority to a co-pending U.S. patent application Ser. No. 16/002,148 filed Jun. 7, 2018, now issued as U.S. Pat. No. 10,805,434 which claims the benefit of U.S. Provisional Patent Application Ser. No. 62/516,753 filed Jun. 8, 2017 entitled "Dynamic TCP Stream Processing". The entire contents of each of the above applications are hereby incorporated by reference.

BACKGROUND

Technical Field

This patent application relates to network connected devices, and more particularly to in-line content inspection.

Background Information

Content inspection is a technique frequently employed by networked data processing systems for various reasons. A data packet is examined as it passes an inspection point, searching for viruses, spam, sensitive data, key words or other content level criteria. Content inspection looks at what the actual message payload contains instead of focusing on the headers or other routing behavior of individual packets. Content inspection works by capturing data packets in transit on a network and analyzing their content for sensitivity. This may involve identifying known data structures (such as the patterns used for credit card numbers) or keywords that indicate sensitivity (such as "confidential"), or the signatures of spam or viruses. Content inspection can also be used for categorizing or classifying data and can apply pre-configured rules to ensure compliance with payment card industry data (PCI), personally identifiable information (PII), protected health information (PHI), securities trading rules, and other standards.

One approach, described in U.S. Pat. No. 9,607,307 (Amicangioli) is an in-line network traffic capture system that leverages a transparent cut-through logic device and a real-time packet processor that is particularly useful in high-frequency electronic securities trading networks. The system receives messages containing requested transactions from one or more Client machines (which may be operated by a brokerage firm or other customer) via first interface. The transaction information is inspected to determine compliance with at least one transaction risk rule, and then sent to one or more Market servers (which may be operated by a securities exchange) via a second interface. The interfaces are coupled to one another through the fixed cut-through logic and operate independently of one another. The fixed cut-through logic is a two-port device that directly forwards transaction information received on the first port to the second port; does not terminate a communication connection with either the Client machines or a Market server; and can begin sending part of the transaction information to a Market server prior to receiving all of the information concerning the transaction from the Client. If the transaction would violate a rule, the transaction information message is altered before the entire message is sent to the Market server.

SUMMARY

Problems with Prior Solutions

Existing content inspection techniques exhibit problems in some applications. As one example, consider a high frequency securities trading network where multiple Client devices send securities trade orders to Market devices. A trade order may be formed as a message and combined with other messages in a packet. In this environment, a trade order should be rejected, that is, it should not be permitted to travel from the client to the market (C2M), unless it complies with a number of rules.

Content inspection implementations in this environment have typically used two methods for message rejection, "One and Done" and "Gap Fill Overwrite". Both of these methods are deficient in that they are risky when it comes to market compliance, confusing to clients who want to know about the status of their order, or require a complete disconnect from the trading session.

One and Done, for example, forces a client device to disconnect from a session, an unideal strategy in the world of high speed, low latency trading systems. The disconnect caused by One and Done can also result in lost orders, client algorithm confusion, and difficulty reconnecting.

Gap Fill Overwrite uses test symbols like "ZVZZT" to overwrite messages, a method that is now more restricted by various exchanges. Because of this restriction, Gap Fill Overwrite exposes the system to potential compliance issues. The overwrite also relies on the market to respond with an acknowledgement (ACK) for the overwritten message. Without this ACK, the client is not notified of the message rejection, and they have no way of knowing if their order is done for the day, or still open on the exchange. Indeed, order "cancel storms" have been observed to result from issues such as this.

Summary of Preferred Embodiments

This document describes improvements to a distributed, transparent, in-line risk management and traffic capture system for content inspection. The approach described herein provides a solution for modifying, or even removing rejected messages from packets as they are sent through an inspection device in real time. By keeping track of the bytes removed, on a per-session basis, sequence numbering is preserved. In the event of a message modification, a notification is returned to the message originator to inform them of the modification.

In one embodiment, packets associated with a network session are inspected as they travel between a first network endpoint and a second network endpoint. Upon determining that a message within a selected packet should be modified, such as when the message does not comply with a content rule, a modified packet having rejected content removed or modified is determined. A modified sequence number for the modified packet is also determined by adjusting a sequence number of the selected packet. The modified packet is then sent to the second endpoint in place of the selected packet. A reply message is also returned to the first endpoint, indicating that the original message in the selected packet was modified.

The modified sequence number may be determined by maintaining an accumulator value, and a delta value representing a difference in byte count between the original packet and the modified packet. When an acknowledgement of the modified packet is detected from the second endpoint, the delta value may be added to the accumulator value.

Furthermore, when a subsequently received packet has a sequence number greater than the sequence marker value, a sequence number of a subsequent packet received from the first endpoint may be modified by the accumulator value.

In addition, an acknowledgement sequence number of another packet received from the second endpoint may be adjusted based on the accumulator value.

In some implementations, the first endpoint may be a client device associated with a trading firm, and the second endpoint may be a market device associated with a securities exchange system, and the messages are orders to trade a security. In those implementations, the reply message may include a reason for rejecting an order.

Embodiments may also determine whether an acknowledgement for a reply message has been received from the second endpoint. While that acknowledgement has not been received, the modified packet can be retransmitted on a repeated basis until the session is disconnected after a time out period.

In some implementations, determining whether an acknowledgment for the reply message has been received may involve periodically polling the delta value.

When an acknowledgement for the modified packet has not yet been received, and while a subsequent packet also needs to be modified to generate a second modified packet, it may be advantageous to stall the second modified packet until the acknowledgement for the modified packet is received.

In some preferred implementations, communication is duplex such that messages and their acknowledgement with modified sequence numbers (as needed) may be sent between the first endpoint and second endpoint in both directions at the same time. This permits content inspection and message modification to occur on the fly in one direction, while also injecting notification reply messages at the same time in the other direction.

BRIEF DESCRIPTION OF THE DRAWINGS

The description below refers to the accompanying drawings, of which.

DETAILED DESCRIPTION OF AN ILLUSTRATIVE EMBODIMENT

As mentioned above, embodiments of the invention are configured to provide in-line content inspection and modification. Devices that implement the methods and apparatus described below are typically implemented in a computer networking device, located between a first and second network endpoint. The detailed description of preferred embodiments that follows is largely within the context of an inspection device that monitors messages that contain market orders in a high frequency securities trading system. However, embodiments of the inspection device can be deployed in other applications where the content of a data stream is to be monitored with minimal latency. These may include applications which detect sensitive data, or where data integrity and ordering is crucial (such as in database systems), in health records processing systems, blockchain systems, and in packet filtering devices more generally.

Figure 1:
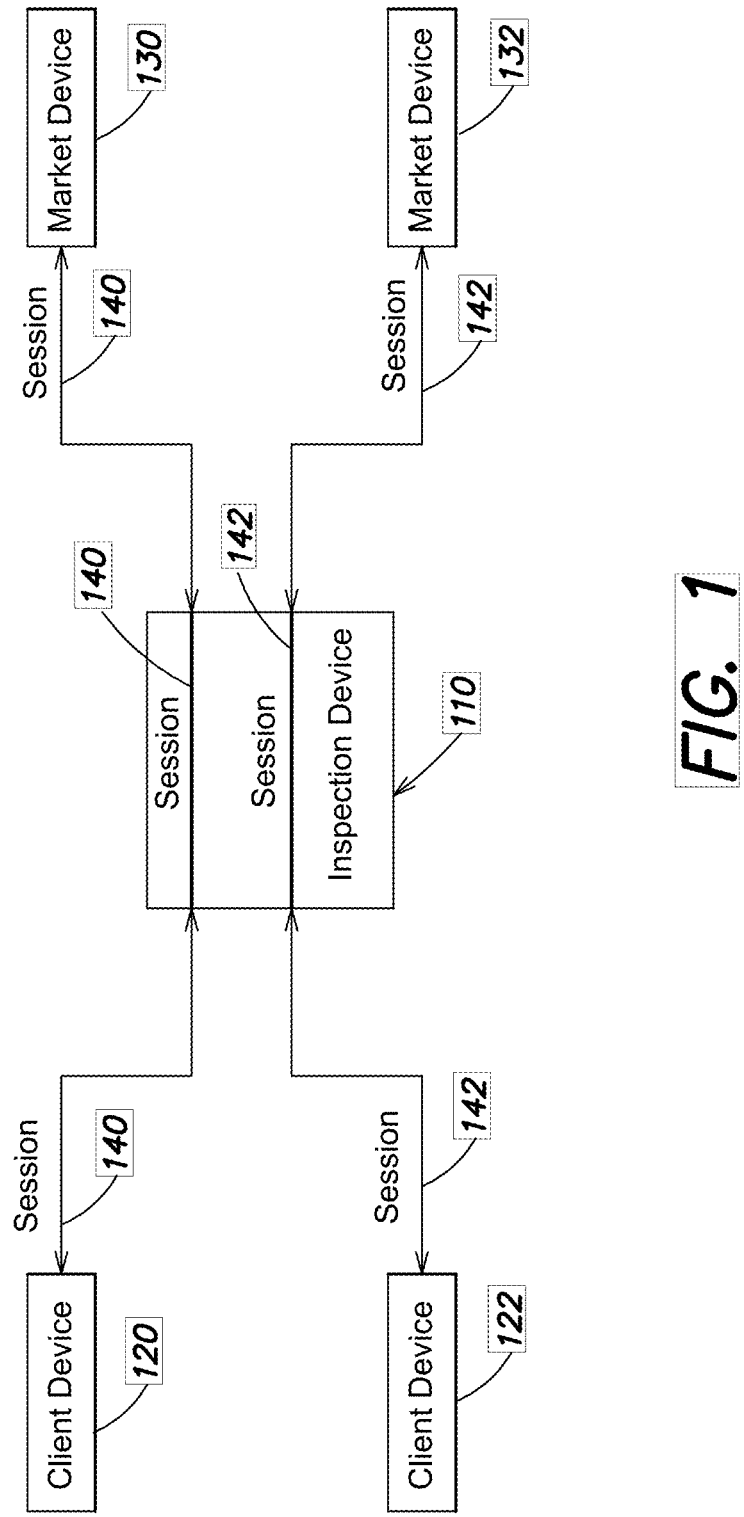
FIG. 1 is a high level diagram of one example embodiment.

As one example implementation, consider a high frequency securities trading network shown in FIG. 1. One or more Client devices 120, 122 (which may be operated by a brokerage firm) establish networking sessions 140, 142 with one or more Market devices 130, 132 (which may be operated by a securities exchange), and send securities trade orders to these Market devices 130, 132. A trade order may be formed as a message and combined with other messages in a packet. The messages may be exchanged according to an application level protocol (such as NASDAQ OUCH, for example). An Inspection device 110 inspects the content of the messages sent over the networking sessions 140, 142 between the Client Devices and the Market Devices. Inspection device 110 is preferably a cut-through device, such that its presence in the network is opaque to the client and market devices. In these cut-through embodiments, networking sessions 140, 142 may flow straight through the Inspection device 110 without any network termination at the Inspection device 110. In some embodiments, the network sessions 140, 142 are established according to a sequenced transport level protocol, such as TCP or Infiniband.

Inspection device 110 serves, in this embodiment, to ensure that rejection of "bad" trade orders—that is a message flowing in the Client to the Market direction (C2M) is not permitted to reach the respective market device unless it complies with a number of rules. To prevent a badly formed or non-compliant message being sent from a client device 120 from reaching a market device 130, Inspection device 110 may modify the non-compliant message, thereby possibly adjusting the size of the message. In environments in which the network session is according to a sequenced transport protocol, such as TCP, the Inspection device 110 may adjust the transport protocol sequence number of subsequent packets arriving on that session in the C2M direction (and the acknowledgement sequence number of subsequent packets arriving in the M2C direction) to account for an increase or decrease in bytes due to modifying the non-compliant application level message in the packet.

The Inspection device 110, in a preferred embodiment, also creates a reply message indicating that the non-compliant message was modified, and sends this reply message to the client device which originated the non-compliant message. In some embodiments, the reply message may be "injected" into the network session by the Inspection Device 110, and may appear to be originating from a market device that was the intended recipient of the non-compliant message. When the network session established between the client device and the market device is according to a sequenced transport protocol, such as TCP, the injection of the reply message into the network session may also involve adjusting a transport protocol sequence number for packets in that session being sent in the market to client direction (M2C), to account for the size of the reply message.

Figure 2:
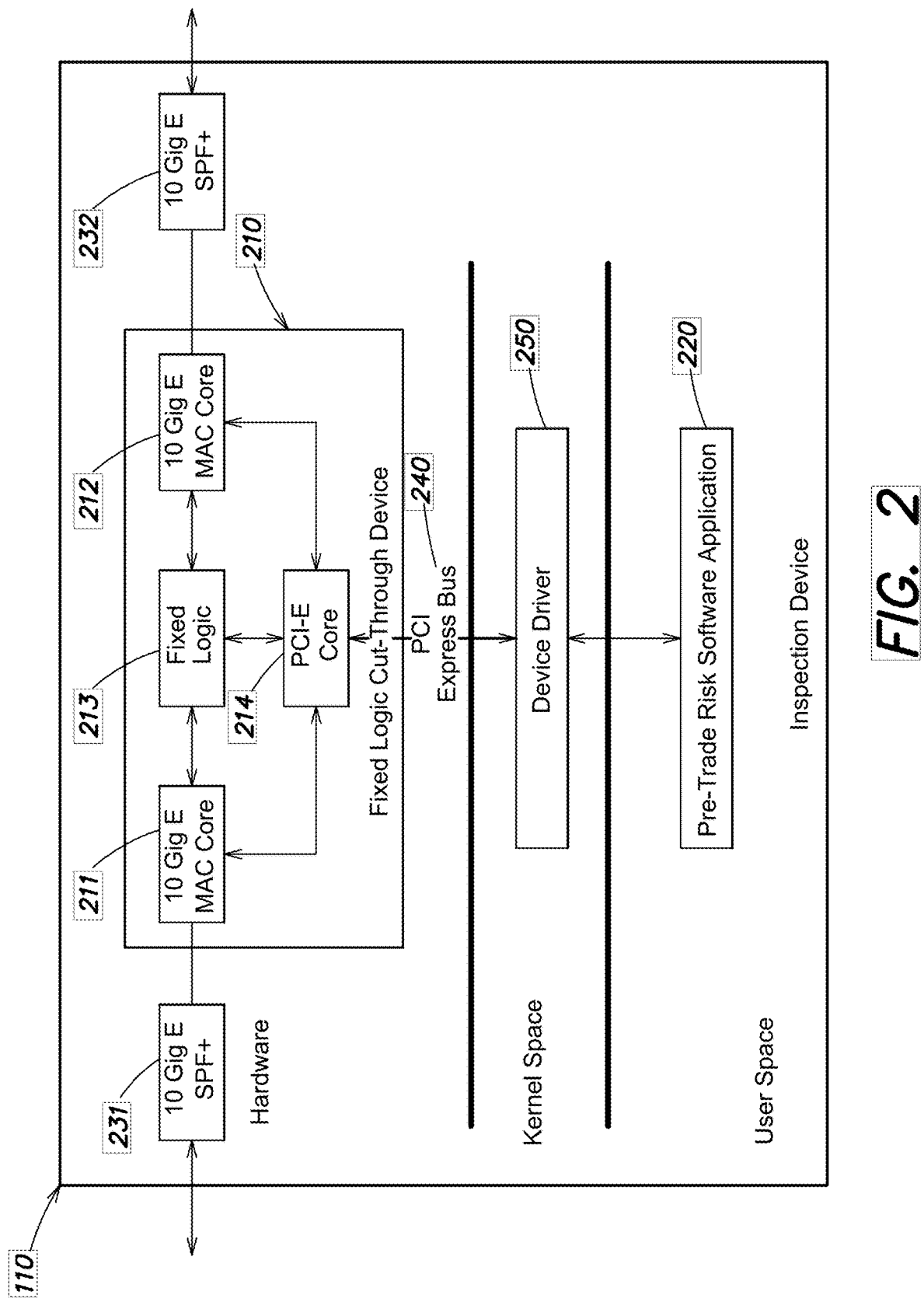
FIG. 2 illustrates an inspection device in more detail.

FIG. 2 shows an example embodiment of an Inspection Device 110 in more detail. Although in this example, functionality in the Inspection Device 110 is distributed across both hardware and software, Inspection Device 110 may be implemented in any suitable combination of hardware and software, including pure hardware and pure software implementations. For example, in this embodiment, in order to achieve low levels of latency, some functionality is implemented in hardware in Fixed Logic Cut-Through Device 110, while other functionality is implemented in software in Device Driver 250 and Pre-Trade Risk Software Application 220. Fixed Logic Cut-Through Device 210 may be implemented in any suitable way, including an Application-Specific Integrated Circuit (ASIC) or Field Programmable Gate Array (FPGA). Pre-Trade Risk Software Application 220 and Device Driver 250 may be implemented as instructions executing on one or more programmable data processors, such as computing cores (CPUs).

While any suitable physical network layer may be employed, (including Infiniband or Ethernet, over fiber or copper cables), in this example, Inspection device 110 has two Gigabit Ethernet SFP+ connectors (interfaces) 231 and 232, which may be connected to a client device and market device, respectively. These connectors 231 and 232 are electronically coupled in this example to 10 GigE MAC Core 211 and 212, respectively, which in this embodiment are implemented by Fixed Logic Cut-Through Device 210.

In some embodiments, Fixed Logic Cut-Through Device 210 may also include other components. In the example of FIG. 2, Fixed Logic Cut-Through Device 210 also includes a Fixed Logic 213 component, which may implement functionality such as packet inspection and sequence number modification as described in detail below. The Fixed Logic 213 may itself be implemented in an FPGA 213 (as will also be mentioned below). Fixed Logic Cut-Through Device 210 also includes a PCI-E Core 214, which may implement PCI Express functionality. In this example, PCI Express is used as a conduit mechanism to transfer data between hardware and software, or more specifically, between Fixed Logic Cut-Through Device 210 and the Pre-Trade Risk Software Application 220, via Device Driver 250 over PCI Express Bus 240. However, any suitable data transfer mechanism between hardware and software may be employed, including Direct Memory Access (DMA), shared memory buffers (which may be arranged in a ring), or memory mapping.

Functions Performed by the Inspection Device 110

Figure 3A:
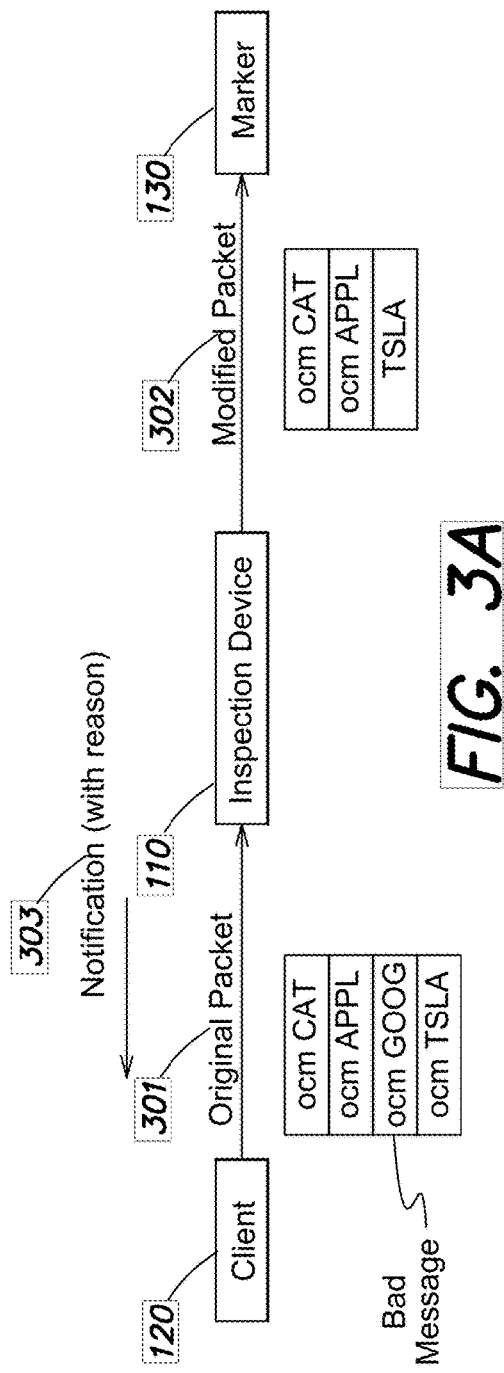
FIG. 3A shows an implementation in a securities trading system and FIG. 3B is an implementation for packet filtering more generally

FIG. 3A is an example of how the Inspection Device 110 can implement Dynamic Stream Modification (DSM) in a trading network. At step 301, a client device 120 generates an original packet containing messages that are orders to trade a security. The original packet is addressed to a market device 130 via a session 140 connection between them. The packet however first travels through the inspection device 110 that is also able to monitor the session 140. In this example, the original packet contains four Orders from Client to Market (OCMs), a first OCM to buy Caterpillar (CAT) stock, a second order to sell Apple Computer (APPL) stock, a third order to buy Google (GOOG), and a fourth order to sell Tesla (TSLA).

The inspection node 110 inspects the content of these messages for compliance with trading rules. For example, the rules might check the order to determine if the quantity and price are within expected ranges, or are for restricted stock, short sales, or clearly erroneous trades. Rule checks might also include per account quantity, price and value limit tests, credit limits, concentration limits, repeat orders, exposure, broker account and session disable tests. The particular rules used to inspect the message may be of many types, and are not important to the present embodiment.

What is important is that at step 302 the inspection device 110 determines that the third message, an order for Google stock, is a bad message and should not be permitted to reach the market device 130 in its entirety. As a result, the modified packet sent to the market does not include that bad message, and at step 302, a Notification message is sent (e.g., "injected into the session 140") back to the client 120. In a preferred embodiment, the Notification message includes a field with a reason why the order was rejected.

Figure 3B:
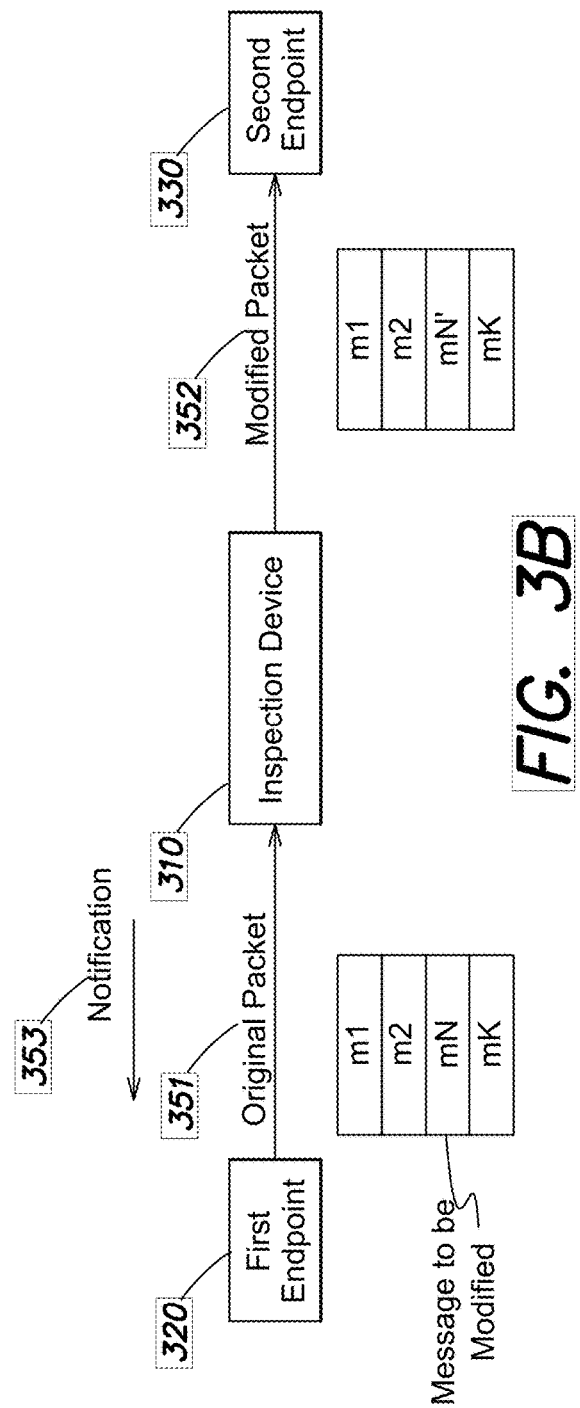

As mentioned previously, it should be understood that the Dynamic Stream Modification (DSM) concepts described herein can be applied to other content inspection applications. FIG. 3B shows this situation more generally, where a first endpoint 320 establishes a session with a second endpoint 330. An original packet with messages m1, m2, mN, . . . mK is sent from the first endpoint at step 351. At step 352 the inspection engine 310 determines that one message, mN, needs to be modified and generates a modified message mN'. The modified packet containing messages m1, m2, mN', . . . mK is then permitted to travel to the second endpoint 330. At step 353, a notification message is returned to the first endpoint 320, alerting the first endpoint 320 that a message in the original packet was modified.

Dynamic Stream Modification

As mentioned previously, the inspection device 110 preferably implements Dynamic Stream Modification (DSM) as a way to remove bad messages from packets in the C2M TCP stream, and to adds error messages to packets in the M2C TCP stream. To do this without disturbing a TCP session, it does so by a) keeping track of all bytes removed in the C2M direction and b) modifying TCP sequence numbers on the fly.

DSM maintains several data values, preferably on per-session, per-direction basis as follows:

Accumulator—The total number of bytes removed/inserted throughout the life of a TCP stream. This is preferably a hardware register (that is, maintained in the fixed-logic cut-through device 210) that is used to modify the TCP sequence number of packets. By keeping track of all modified bytes, the TCP sequence of a packet can be modified on the fly. However, when a packet has bytes modified, this register is preferably updated only when the ACK for that packet is received.

Delta—The number of bytes removed/inserted in the last packet that set the Sequence Marker (last modified packet). The Delta is preferably a hardware register that acts as temporary storage for number of bytes removed in this last packet. When the ACK for this packet is received, the Delta is added to the Accumulator.

Sequence Marker—A value based on the sequence number of the last packet that had bytes removed/inserted (i.e., the last modified, that is, killed or injected packet). For example, in embodiments using TCP, in which a packet has a starting sequence number and an ACK sequence number, the Sequence Marker may be a value based on a sum of the last modified packet's (starting) sequence number and the last modified packet's length in bytes (as modified). In TCP, this value would also be equivalent to the next expected starting sequence number for a subsequent packet traveling in the same direction on the same session. For a packet that is completely removed as part of the modification, the Sequence marker corresponding to the removed packet may be equivalent to the removed packet's starting TCP sequence number, because the length of the removed packet, as modified, is zero. When using TCP, the Sequence Marker Value is also equivalent to an ACK sequence number acknowledging the last modified packet (if the last modified packet was not completely removed as a result of the modification). This ACK sequence number is present in packets being sent in the opposite direction, acknowledging receipt of the modified packet.

Packets with a sequence numberless than the Sequence Marker have their TCP sequence modified by just the Accumulator. For packets with a sequence number greater than or equal to the Sequence Marker, their TCP sequence is modified by the Accumulator plus the Delta. When the ACK for the last modified packet is received, the Sequence Marker is cleared. Some embodiments may store Sequence Marker values corresponding to the last several modified packets, which allows for making sequence value adjustments to packets even while multiple modified packets are still unacknowledged.

CONN_MOD_PENDING—A boolean value (which may be set in the PTRS application software 220) to indicate that an ACK has not yet been received for a modification. Upon DMA of the modified packet, the boolean is set. Upon ACK of the modified packet, it is cleared. This boolean is used to ensure that the modified packet reaches its intended destination. There is a CONN_C2M_MOD_PENDING and a CONN_M2C_MOD_PENDING, as data modification can (and typically will) happen to both directions simultaneously.

The following functions may be performed by the Inspection Device 110 as part of Dynamic Stream Modification:

Bad Message Removal. DSM removes bad messages from packets in the C2M packet stream and adds error messages to packets in the M2C packet stream. To do this without disturbing the connection, it should a) keep track of all bytes removed and b) modify TCP sequence numbers on the fly. DSM maintains a number of values to do this on a per-session basis, including an Accumulator, Sequence Marker, and Delta (described in more detail in later sections).

C2M (Client to Market) Modification Packet Construction, Transmission, and Guaranteed Arrival. The Inspection Device 110 may modify rejected C2M packets by removing bad messages. These modified packets are then transmitted to the market device. Their successful transmission may be guaranteed by using a combination of Lazy ACK detection, polling, and repeated retransmission. Arrival of the C2M modified packet to the market is guaranteed.

M2C (Market to Client) Error Packet Construction, Transmission, Return to Sender, and Guaranteed Arrival. In order to notify the client of a rejected message, the inspection device 110 may construct M2C error packets.

TCP dysfunctionality/disconnect avoidance—DSM may avoid TCP dysfunctionality and will cleanly remove/add data to TCP streams. It may also handle transmission attempts for modified messages in the middle of TCP fragmentations. Disconnecting a session should be avoided unless necessary.

Data Insertion/Error Injection—When a modification occurs in the C2M direction, data insertion/error injection can be used to notify the client of the rejection. A packet concatenated with messages containing 1) a header and 2) a protocol specific reject message will be injected into the M2C TCP Stream. This lets clients know the status of their order, avoiding unnecessary cancel storms or algorithm confusion. This error injection will be completely hidden from the market side, and the TCP connection will remain active once the bytes are injected.

ACK Detection/Guaranteed arrival—Once a modified packet is transmitted in the client or market direction, the Inspection Device 110 preferably should guarantee the arrival of said packet. This guaranteed arrival can be done by 1) checking ACK sequences of packets arriving in the opposite direction the modified packet was transmitted or 2) reading the delta register from the Fixed Logic (FPGA) 213 to see if it has been zeroed (signaling that the ACK corresponding to the sequence marker has arrived). ACK detection employs both of these methods to check if the packet has arrived at the intended destination. If an ACK is not detected within a certain time frame, the modified packet is retransmitted. This is continued until the Inspection Device 110 gives up and disconnects the session.

Data Removal/Modification—Removing bytes from a killed packet allows the Inspection Device 110 to avoid Gap Fill Overwrite and One and Done as methods of rejecting messages. This data removal will be hidden from the market side entirely, and the TCP connection will remain active.

Fixed Logic Cut-Through Device 210

DSM removes bad messages from packets in the C2M TCP stream and adds error messages to packets in the M2C TCP stream. To do this without disturbing the connection, it should a) keep track of all bytes removed and b) modify TCP sequence numbers on the fly. The three values that DSM uses to do this are listed above (Accumulator, Sequence Marker, and Delta).

Figure 4:
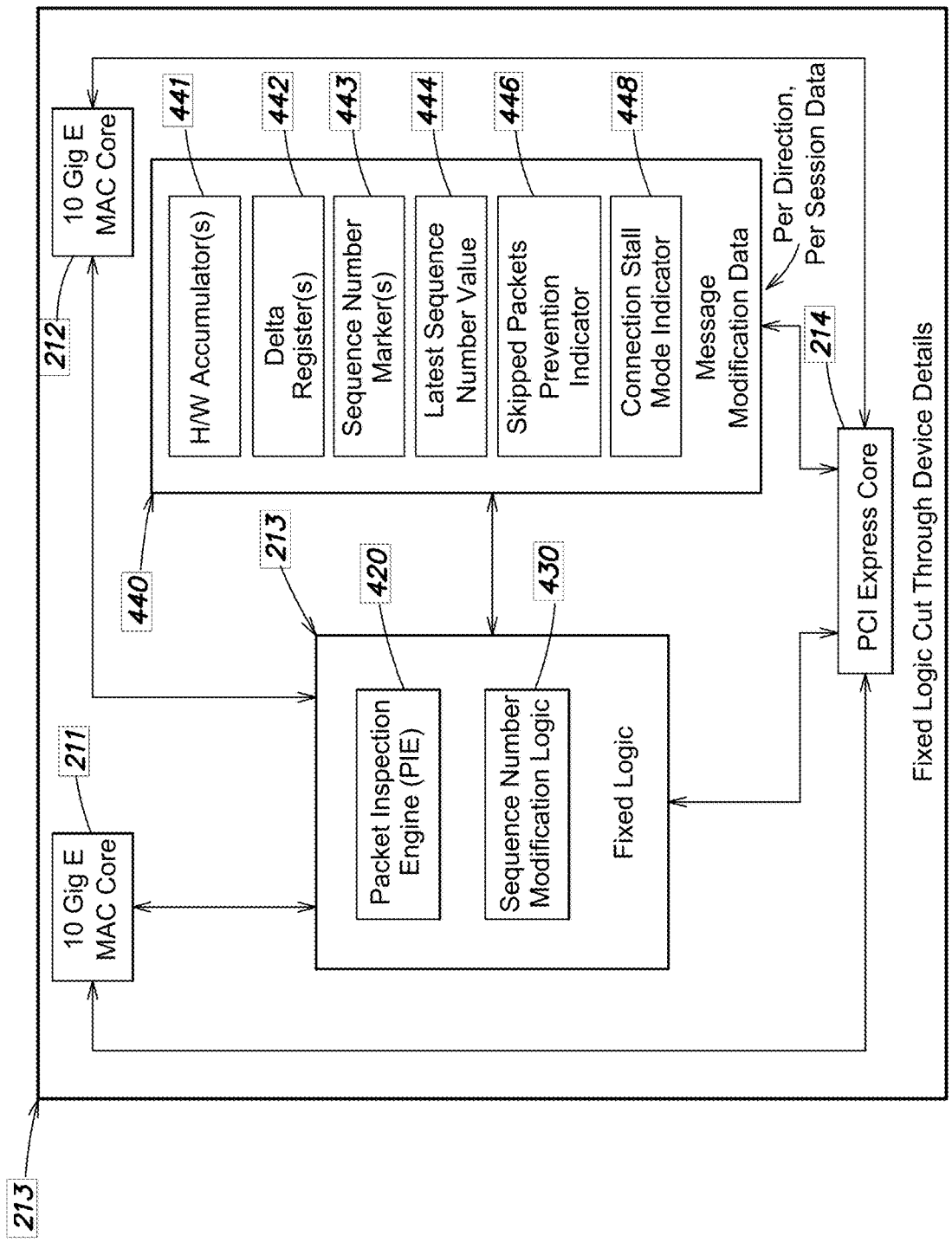
FIG. 4 is a more detailed view of a fixed cut through logic device.

FIG. 4 is a more detailed illustration of an embodiment of the Fixed Logic Cut-Through Device 210, first illustrated in FIG. 2. Fixed Logic-Cut-Through device 210 includes two 10 GigE MAC cores 211, 212 (one each for the client side and market side), fixed logic (FPGA) 213, PCI express core 214, and message modification data store 440.

In some embodiments, Fixed Logic 213 may include a Packet Inspection Engine (PIE) component 420 and a Sequence Number Modification Logic component 430. Packet Inspection Engine 420 may inspect networked packets containing application level messages being sent over a networking session between a client and a market device to determine, for messages originating from the client, whether a given message is compliant and should be allowed to reach the market device, or whether the message instead needs modification. In some embodiments, once a message has been modified, a transport protocol sequence number of subsequent packets on the same session may be modified by Sequence Number Modification Logic 430.

In this example, Fixed Logic Cut-Through Device 213 also includes Message Modification Data store 440, which may store state information used in conjunction with message modification and sequence number modification. Message Modification Data 440 may be maintained per session, per direction (both C2M and M2C). Although in this example, Message Modification Data 440 is illustrated as being resident in Fixed Logic Cut Through Device 110 itself, Message Modification Data may be in any other suitable storage component in or accessible to the Fixed Logic Cut-Through Device 210.

Message Modification Data 440 may include one or more Hardware Accumulator(s) 441, each of which may be used to keep track of a cumulative value by which sequence numbers for packets flowing a given direction in a given session may be modified as a result of one or more prior packet modifications for that direction and session. In embodiments in which the protocol for a given session includes acknowledgement (ACK) packets including sequence numbers for packets that have been acknowledged by a receiving endpoint, Hardware Accumulator(s) 341 may also be used to modify ACK sequence numbers for ACK packets flowing in the opposite direction in that session. In some embodiments, it may be useful to maintain one or more Delta Register(s) 442, which may be used to keep track of a difference in sequence number due to a difference in size of a newly modified packet that has not yet been acknowledged via an ACK packet. The values in Delta Register(s) 442 may be stored in hardware registers or any other suitable volatile or non-volatile memory or storage in the inspection device. Message Modification Data 440 may also include Sequence Number Marker(s) 444, which may be used as threshold value(s) for taking action based on a sequence number of a packet. For example, in some embodiments, a Sequence Number Marker 443 may be used to represent an expected ACK sequence number for a newly sent modified packet, such that when a packet with an ACK sequence number matching a value stored in Sequence Number Marker 443 is received, a value in a Delta Register 442 may be applied to a Hardware Accumulator 441.

While a non-compliant packet is still in the process of being modified by the Inspection Device 110, it may be desirable in some embodiments to delay transmission of subsequently received packets in the same direction on the same session as the modified packet until the modified packet has been fully processed. This delaying may be desirable to prevent a situation in which compliant packets (not needing modification) in the same session sent after a packet needing modification reach the destination market device before the modified message. Such embodiments may enable a Skipped Packets Prevention Indicator 446 to indicate detection of a message needing modification, and may also store in a Latest Sequence Number 444 a value for a sequence number for such a packet that is still in the process of being modified. In this example, transmission of subsequent packets may be delayed while Skipped Packets Prevention Indicator 446 is enabled. When a modified packet has been fully processed, and packets subsequently delayed as a result of Skipped Packets Prevention being enabled have also been fully processed, some embodiments may clear Skipped Packets Indicator 446. In some embodiments, determining whether to clear Skipped Packets Prevention Indicator 446 may additionally or alternatively involve a comparison between the sequence number of the modified packet and the value in Latest Sequence Number 444. Packets that arrive at the Inspection Device 110 once Skipped Packets Prevention Indicator 446 has been cleared may be treated the usual way, such that compliant packets may pass directly through the Inspection Device to the intended recipient system (i.e., Client Device 120 or Market Device 130).

Similarly, a Connection Stall Mode Indicator 448 may in some embodiments be employed to delay forwarding of packets coming in the M2C direction once it has been determined that a message in the C2M direction needs modification and that a corresponding reply message may be injected in the M2C direction for that session. In some embodiments, Connection Stall Mode Indicator 448 may be enabled upon detection that a C2M packet may need modification, and may be disabled upon fully constructing or injecting the M2C reply message. In such embodiments, while the Connection Stall Mode Indicator 448 is enabled, subsequently received messages in the M2C direction on that session may be delayed. In the case of both the delay in the C2M direction and in the M2C direction indicated by the Skipped Packets Prevention Indicator 446 and the Connection Stall Mode Indicator 448, respectively, the delay may be implemented in any suitable way. For example, in some embodiments, a CPU core processing messages in that direction may be stalled while the indicator is enabled. In other embodiments, subsequently sent messages may be queued for later processing.

Example Sequence of Operations for Message Modification with Notification

Figure 5:
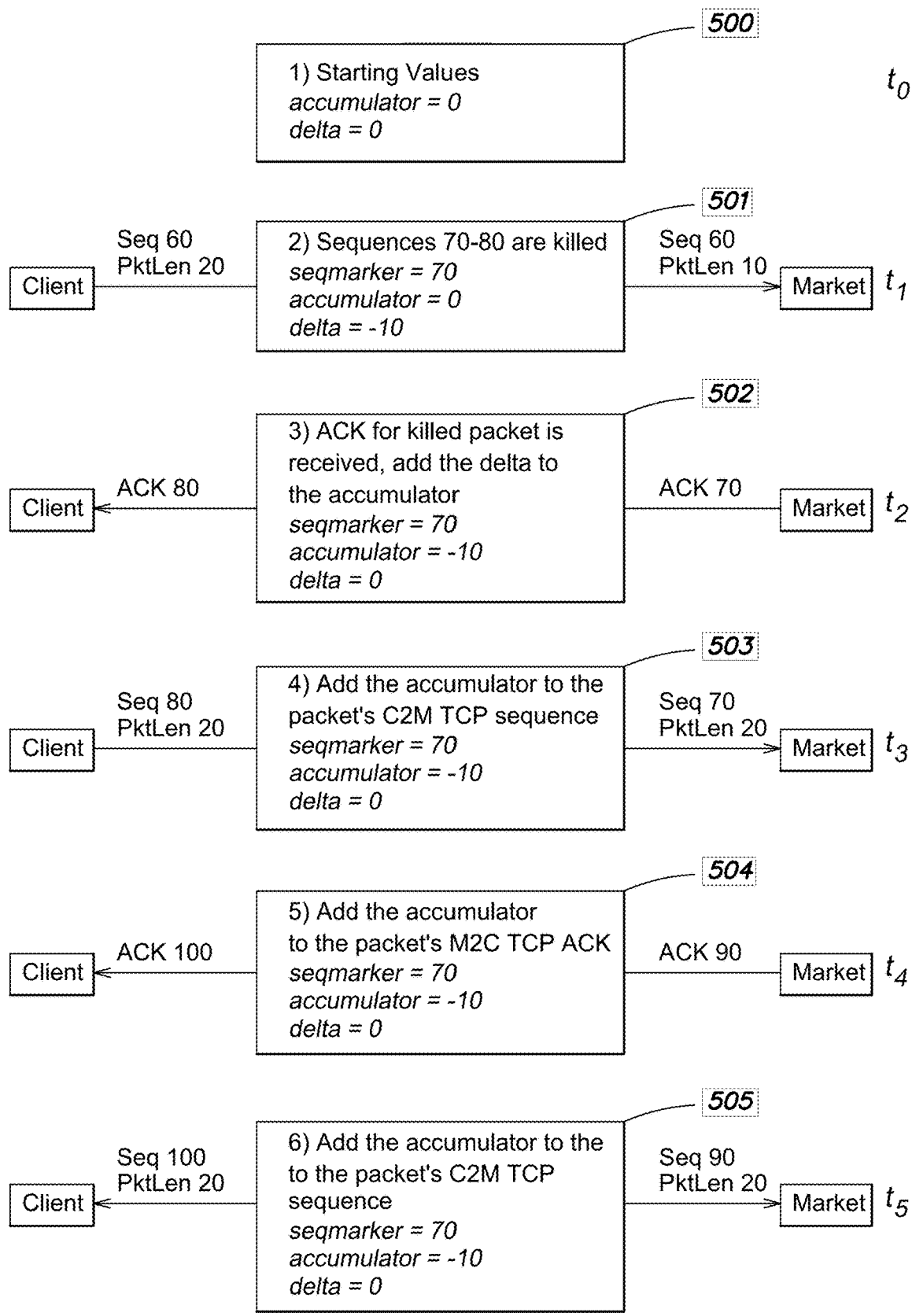
FIGS. 5 and 6 are a sequence of steps performed to modify sequence numbers.
Figure 6:
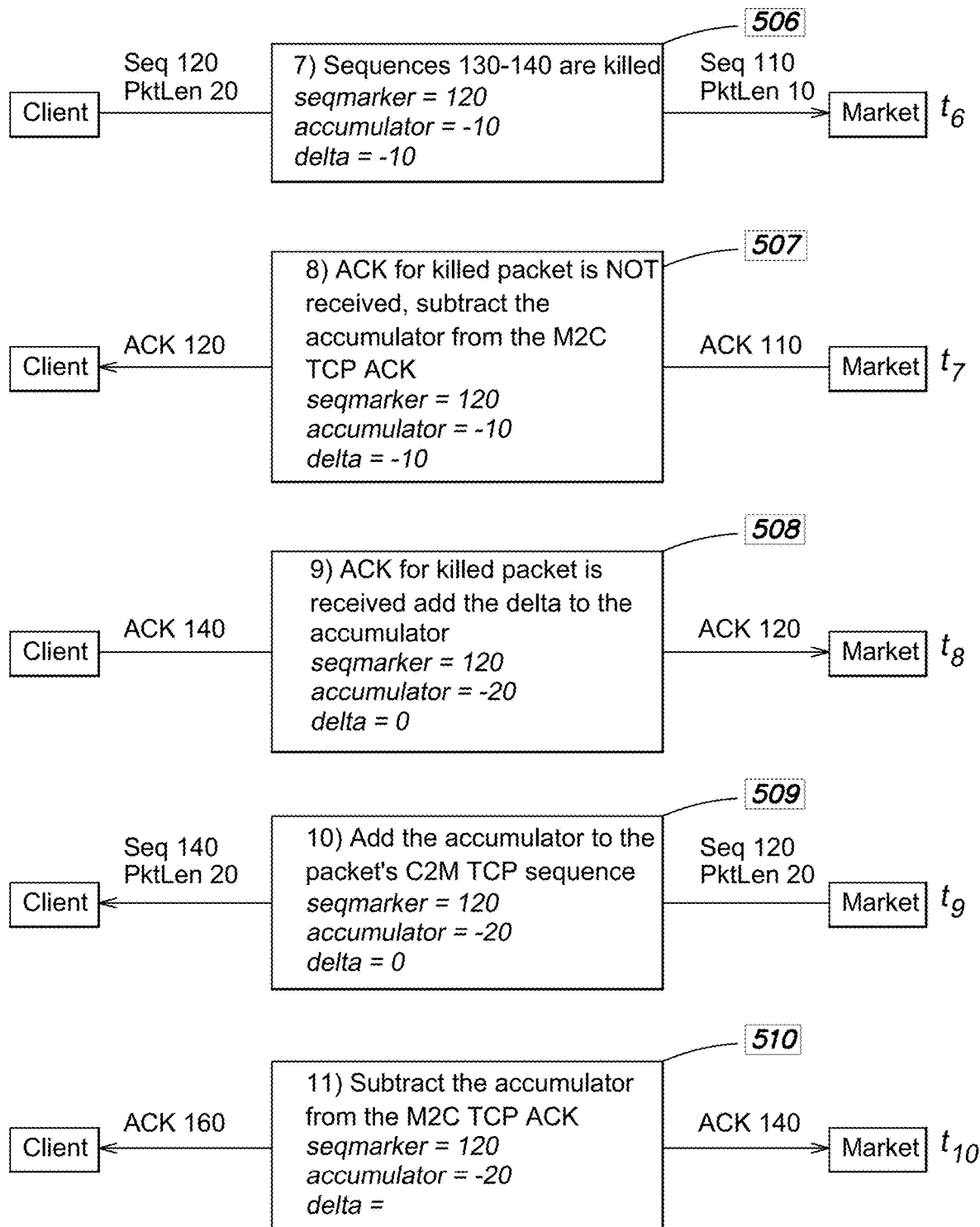

FIGS. 5 and 6 are a more detailed example showing a sequence of operations that may be performed by the inspection engine 110 to implement Dynamic Sequence Modification.

These diagram(s) illustrate how the Accumulator, Delta, and Sequence Marker may be used to preserve one side of a TCP connection (the C2M stream) while removing bytes (or even entire messages) from packets without terminating or interrupting that connection.

Turning to FIG. 5, at time t0 (step 500), the Accumulator and Delta are set to an initial value, such as "0". At time t1 (step 501), when a packet needs to be "killed" (that is, at least one message needs to be modified in the packet), the number of removed bytes is stored in the Delta register. In this example, 10 bytes starting at sequence number 70 were killed and the Delta register set to a value of "−10". The Sequence Marker was set accordingly to a value of "70". When the ACK for the packet arrives, the number of bytes from the Delta is added to the Accumulator. The number of bytes removed from the killed packet is not immediately added to the Accumulator upon transmission. That is, packets that were transmitted BEFORE the killed packet could potentially be ACKed.

In order to make sure that an ACK for such a packet that was transmitted before the killed packet does not have the wrong value, the addition of the Delta to the Accumulator is held off, to time t2 (step 502).

The sequence marker, accumulator and delta register values are used to adjust the ACK sequence numbers of the ACK packet traveling in the M2C direction, at time t2.

A second received C2M packet at time t3 (step 503) has a start sequence number of 80 and a packet length of 20. This packet does not have any bad messages, and does not need to be killed, and can pass to the Market. However, the accumulator value is used to adjust that packet's sequence number before it is permitted to continue on to the market.

An ACK for the second C2M packet is received at time t4 (step 504), and the accumulator value will again be used to adjust its sequence number before passing the ACK to the client.

Continuing on to FIG. 6, a third C2M packet received at time t5 (step 505) has sequence number 100 and length of 20. It will also have its sequence number adjusted by the accumulator value before passing to the market side.

At time t6 (step 506), before an ACK for the third C2M packet is received from the market, a fourth C2M packet with sequence number 120 and length 20 is received. This fourth packet needs to have bytes removed or "killed". Because the ACK for previous packet has not yet been received at time t7 (step 507), the accumulator is subtracted from the M2C acknowledgment sequence number. At t8 (step 508), once that ACK is received, the delta can be added back to the accumulator.

At time t9 (step 509), a fifth C2M packet with a sequence number of 140 and length of 20 is received. As before, the accumulator value is added to arrive at the sequence number to use for the modified packet. Another ACK received at time t0 (Step 510) is again adjusted by the accumulator value.

As mentioned previously, with this implementation of DSM, the C2M and M2C sides have parallel architectures. Thus there is preferably a separate Accumulator, Delta, and Sequence Marker for the C2M direction as well as for the M2C direction, and for each session. As a result, when bytes are added for the Notification message into the M2C TCP stream (for error injection), a positive Delta can be used. As a result, when the Delta is added to the Accumulator for the M2C side, a positive change is shown, representing the additional bytes. The duality of the M2C and C2M mechanisms is a significant aspect of the preferred DSM architecture.

In some implementations, as will be understood from the detailed discussion below, the Fixed Logic 213 (FGPA) Hardware and PTRS Software 220 may use different numbers of Accumulators and Delta registers. For example, the PTRS software 220 may use two sets of Accumulators and Deltas (one for each direction, C2M and M2C, on each flow); and the Fixed Logic Hardware 213 may use four sets of Accumulators and Deltas. The first two sets of hardware Accumulators/Deltas are used to track regular sequence numbers in each direction (C2M and M2C) for each session (flow). The second two sets are used to track ACK sequence numbers in each direction (C2M and M2C) for each session. An accumulator/delta model along these lines is described in more detail below.

Figure 7:
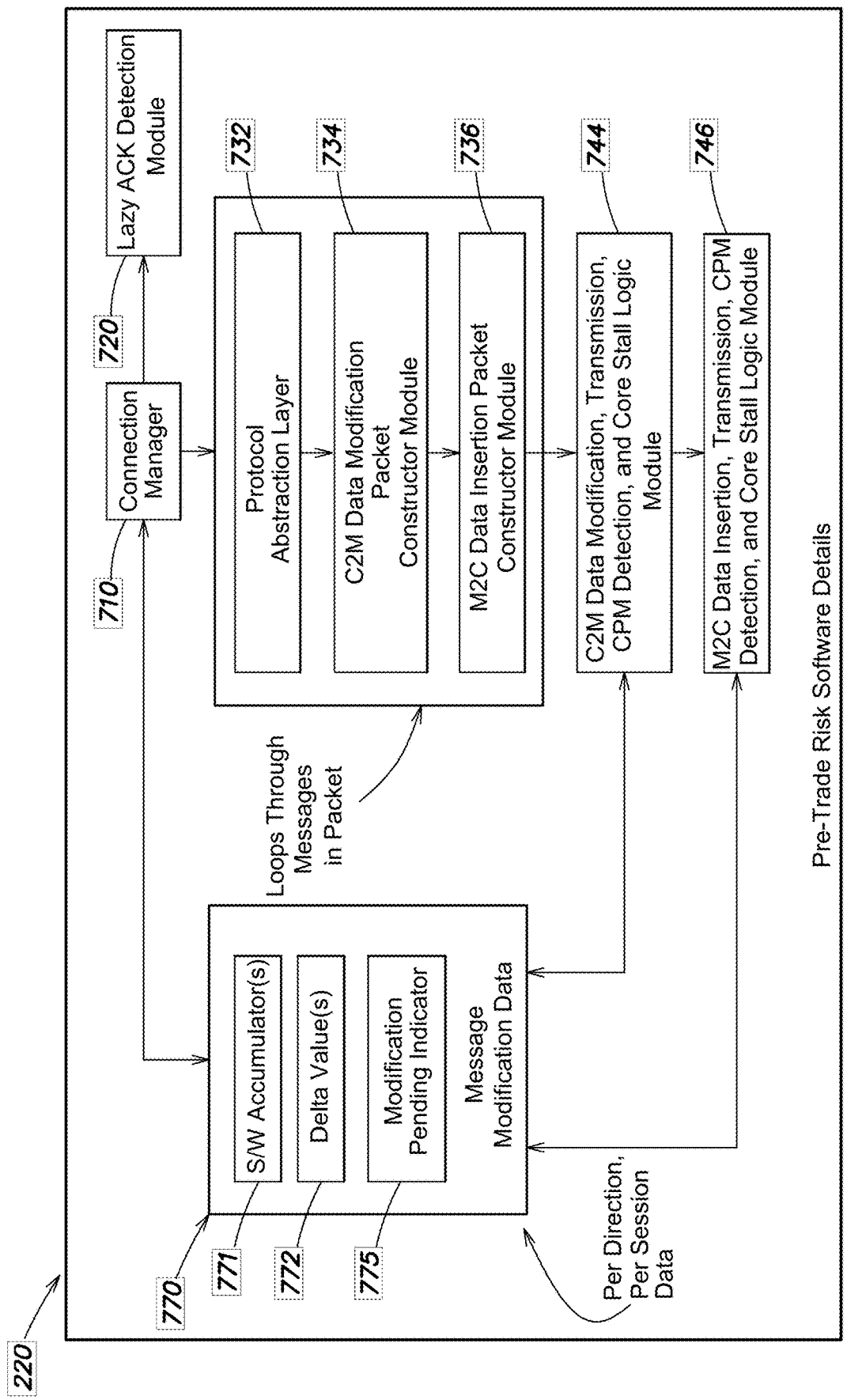
FIG. 7 is a more detailed view of Pre-Trade Risk Software (PTRS)

FIG. 7 is a diagram illustrating components of Pre-Trade Risk Software 220 in the Inspection Device 110 that implements some of the DSM functions, including Modular Decomposition, C2M Bad Message Modification, and C2M Modification Transmission.

Pre-Trade Risk Software 220 may include Message Modification Data store 770, which may be used by Pre-Trade Risk Software 220 in conjunction with message modification. As with Message Modification Data 440 described in connection with Fixed Logic Cut-Through Device 210, Message Modification Data 770 may be state information that is stored per session, per direction (i.e., both C2M and M2C). Message Modification Data 770 may be stored and accessed in any suitable way by Pre-Trade Risk Software 220. Message Modification Data 770 may include Software Accumulator(s) 771 and Delta Value(s) 772, similar in concept to Hardware Accumulator(s) 441 and Delta Register(s) 442, respectively. Message Modification Data 770 may also include Modification Pending Indicator 775 (sometimes also referred to herein as 'CONN_C2M_MOD_PENDING' for the C2M direction, and 'CONN_M2C_MOD_PENDING' for the M2C direction). In some embodiments these Message Modification Pending indicators may be used to indicate that an ACK has not yet been received for a modified packet.

FIG. 7 also illustrates components 710 through 746, described in greater detail below, which process packets flowing through the Inspection Device 110 and make use of Message Modification Data 770. In this example, Connection Manager 710 may identify a session, for example, based on origin and destination IP addresses/ports), and implement a model of connection state both on the client and the market side, such as by maintaining the state of ACKs and SYN ACKs. Connection Manager 710 may also call Lazy ACK Detection Module 720, which may contain logic that uses Message Modification Data 470 to ensure successful receipt of a modified packet by the market or an injected message by the client. Lazy ACK Detection Module 720 may do this by periodically retransmitting a modified or injected packet until an ACK is received by the receiving side for the packet.

In embodiments making use of network sessions such as TCP which are sequenced and guarantee in-order delivery, Connection Manager 710 may also ensure that packets are processed by the Inspection Device 110 in proper order according to the packets' sequence numbers and may avoid duplicate processing of packets.

As mentioned previously, a packet may typically include one or more messages. As such, each message in a packet may be separately processed by components 732, 734, and 736. In embodiments in which messages may be sent according to a variety of application protocols, Protocol Abstraction Layer 732 may handle application protocol specific processing.

A message needing modification may then be processed by C2M Data Modification Packet Constructor Module 734, which may modify a non-compliant message. If the modified message has a different size than the original unmodified message, C2M Data Modification Packet Constructor Module 734 may also calculate a new value for a Software Accumulator 771 and/or Delta Value 772 in the C2M direction associated with the session (as explained elsewhere). Similarly, M2C Data Insertion Packet Constructor Module 736 may construct a reply message to inject in the M2C direction for the same session as the modified message, and may also calculate a new value for a Software Accumulator 771 and/or Delta Value 772 in the M2C direction associated with the session.

In the example of FIG. 7, C2M Data Modification Packet Constructor Module 734 may then perform logic to transmit the modified packet to the market. In some embodiments, C2M Data Modification Packet Constructor Module 734 may effect a data transfer of the modified packet to the Fixed Logic Cut-Through Device 210 for transmission to the market device 130. C2M Data Modification Packet Constructor Module 734 may also transfer associated values in Software Accumulator 771 and/or Delta Value 772 in the C2M direction to Fixed Logic Cut-Through Device 210.

Similarly, M2C Data Insertion Packet Constructor Module 736 may perform logic to inject the reply message into the session to be sent to the client 120. In some embodiments, M2C Data Insertion Packet Constructor Module 736 may effect a data transfer of the newly constructed packet containing a reply message to the Fixed Logic Cut-Through Device 210 for transmission. M2C Data Insertion Packet Constructor Module 736 may also transfer associated values in Software Accumulator 471 and/or Delta Value 472 in the M2C direction to Fixed Logic Cut-Through Device 210.

An example of DSM dataflow as controlled by the above components of the PTRS application software 220 may be as follows:

When a packet with a killed message arrives in the datapath (e.g., at the Connection Manager 710), it is parsed (e.g., by the Protocol Abstraction Layer 732) and then sent to be modified by the C2M Data Modification Packet Constructor 734.

For each killed message, an M2C error packet is then created by the M2C Data Insertion Packet Constructor 736. This packet will be used to notify the client of the reject.

After these messages are created, the transmission functions (e.g., C2M Data Modification 744 and M2C Data Insertion 746) are called. The modified C2M killed packet and the M2C error packet are both transmitted.

After the packets are transmitted, ACKs for the packet sequences are detected in the Lazy ACK Detection module 720. To guarantee arrival, packets may be retransmitted periodically, such as every 10 ms (milliseconds) for a total of 100 ms. At 100 ms, if the ACK has not arrived, the sessions are disconnected.

Other functions, such as CPM (Close Proximity Modification) detection and core stalling may also take place in the transmission modules 744, 746. CPMs occur when a second killed packet arrives in the software before the ACK for the first killed packet has arrived. This case is discussed in more detail in the sections below.

Data modification in the C2M direction is preferably implemented to allow for any number of bad messages to be removed or modified in an active TCP stream, while still preserving the sequencing of the active TCP session. The TCP packet modification in module 744 should therefore be hidden from the client and market TCP stacks, though the client should still be notified of the message that was removed as explained above.

In some implementations, bad messages are replaced with a new message of some type, such as a heartbeat. In other words, C2M Data Modification 744, in some implementations, never removes a bad message without replacing it with something else. This is to simplify message modification, and allows for at least some payload to be transmitted (i.e., there will never be a packet that is completely overwritten down to a 0 byte payload).

In some embodiments, the message modification functions may be implemented at least in part by logic in the Protocol Abstraction Layer 732, because the type of modification required may depend on the specific market protocol over which a given session is established. For example, according to the NASDAQ OUCH application protocol, the entire message can be removed from the packet. However, when exchanging messages according to the TSE application protocol, the killed message should be replaced with a heartbeat, so as to preserve application level sequencing between the market and the client.

The C2M Data Modification Transmission (retransmission), in some embodiments, may perform other functions such as:
  recalculating the IP header length of the packet to make sure the removed bytes are not included; and
  setting necessary values/bits when DMA is used to transmit modified packets back to the Fixed Cut Through Device 210 (e.g. in the DMA header and in the DMA call). These values may include:
    Raw/Transform bit in DMA header—Sets this DMA header bit to one so the hardware recalculates the TCP checksum, CRC, and TCP sequence.
    signed 12 bit Delta in DMA header—Sets the delta in the DMA header to communicate the number of bytes modified in the packet (positive delta signals bytes were added, negative signals bytes were subtracted). The Fixed Logic 213 uses this value to update its hardware Delta register.
    unsigned 32 bit Sequence Marker—Sets the Sequence Marker to a value based on the starting TCP sequence of the modified packet being transmitted. This is used to spring the "mousetrap" upon ACK of the modified packet.
    unsigned 32 bit CAM entry—Sets a Content Addressable Memory (CAM) value for the packet to be DMAed out. This can be used to inform s the Fixed Logic 213 of a) the proper TCP sequence to use when it touches up the packet and b) the Delta/Accumulator to update with the new values.

After the modified packet is transmitted, the previously mentioned CONN_C2M_MOD_PENDING boolean may be set.

Timing of Lazy ACK Checking

Figure 8A:
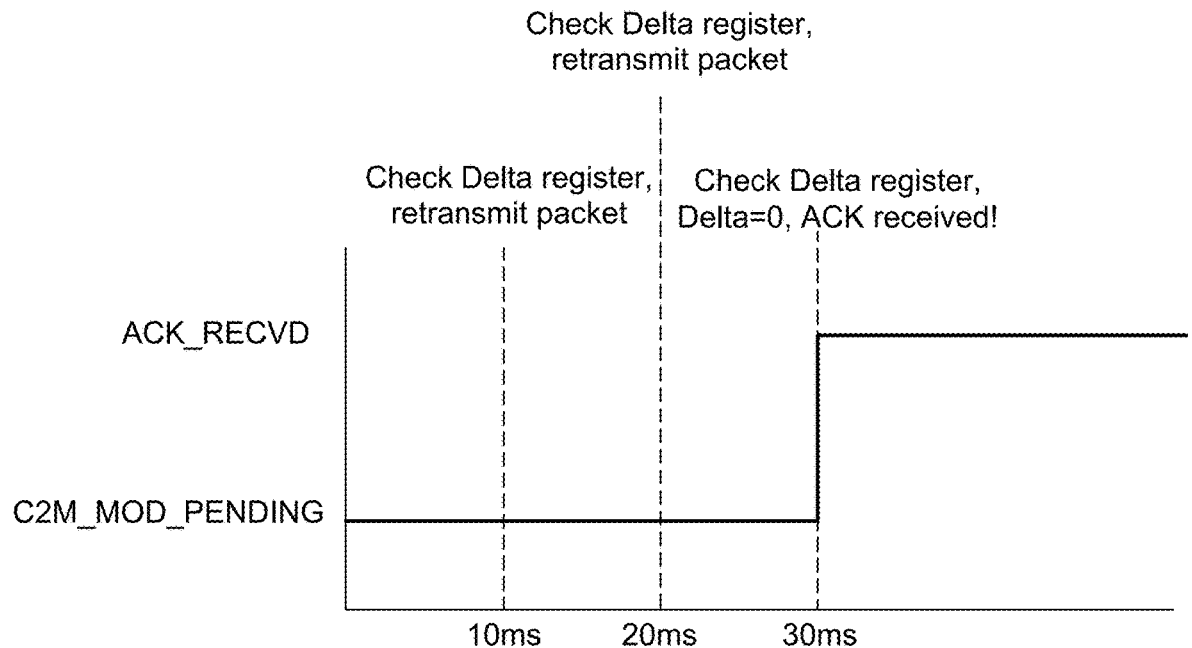
FIGS. 8A and 8B are timing diagrams.
Figure 8B:
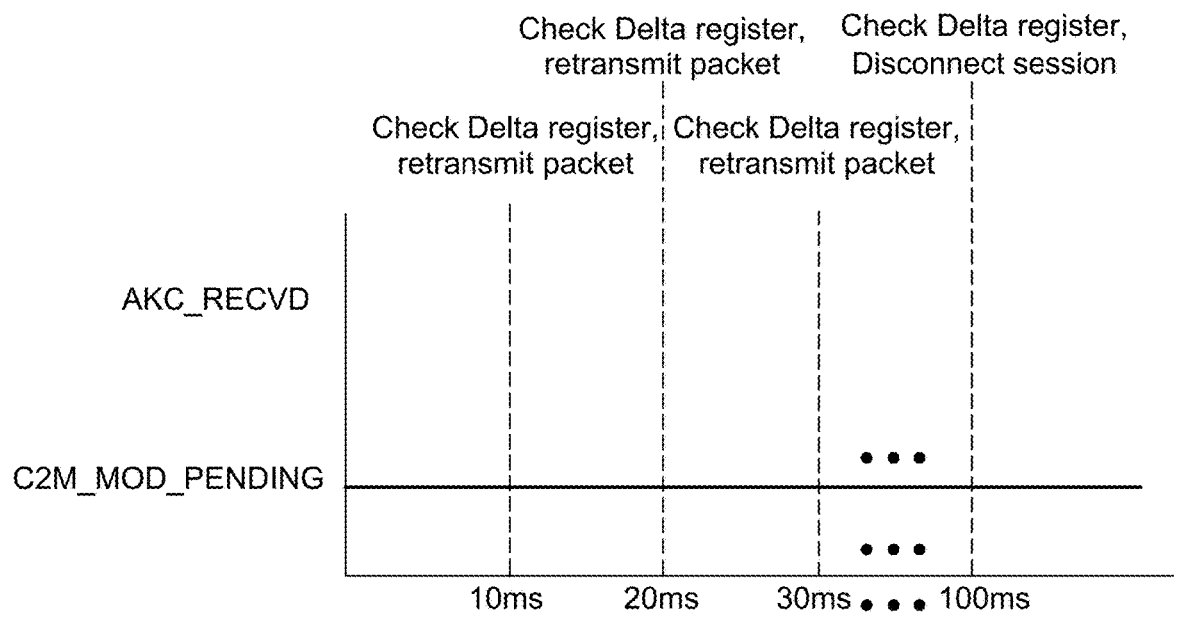

FIGS. 8A and 8B are timing diagrams that illustrate the C2M Lazy ACK Checking function in more detail.

Lazy ACK Checking is used to 1) guarantee the arrival of a modified packet to the market and 2) avoid CPMs (discussed in further sections). Modified packets have the potential to be dropped between the Inspection Device 110 and the market. Because of this risk, there should be a system in place for retransmission and guarantee of packet arrival.

The Lazy ACK Checking function, which may be enabled when the CONN_C2M_MOD_PENDING boolean is set, operates as follows:

All M2C packets for the associated session are checked to see if an ACK has been received for a packet having a sequence number greater than or equal to the Sequence Marker. If the packet is ACKed, the CONN_C2M_MOD_PENDING boolean is cleared.

The Delta register in the Fixed Hardware 213 is polled no later than every 100 ms (roughly 1 round trip (rtt) to the market and back). This register is preferably not polled more than once every 10 ms because it is an expensive call in terms of time complexity. If the register has been cleared, then an ACK for the modified packet was received (because the Delta was added to the Accumulator), and the CONN_C2M_MOD_PENDING boolean can be cleared.

If the Delta has not been cleared, the modified packet is retransmitted. A packet retransmission in Buzzsaw should adjust the sequence number so that the Delta applied by the FPGA does not result in an incorrect sequence. Because the delta is still waiting to be cleared in the FPGA, any retransmitted packets will incorrectly have this delta value applied to the sequence. As a result, software should adjust the TCP sequence number before retransmission so as to undo this adjustment.

At 100 ms, the session times out and is disconnected, it is assumed that if no ACK is seen for 4 rtts to the market and back, the ACK will never be received and it is best to disconnect the session.

Once the ACK has been received, the CONN_C2M_MOD_PENDING boolean is cleared, and the Lazy ACK Checking System is no longer active for this connection.

Lazy ACK Checking may be implemented in two different modules. One module occurs at the top of the CONN_ACTIVE state in the connection manager 710 (FIG. 7). A CONN_ACTIVE state will check the frame direction, CONN_MOD_PENDING boolean, and ACK for the TCP Sequence. The other module checks the 10 ms retransmission time, which may be tracked in a separate process or thread in the connection manager 710.

C2M packet retransmission is not necessary to guarantee arrival of a killed packet, as the client will retransmit the killed packet for us. However, retransmission is needed for CPM avoidance (see the CPM discussion elsewhere for more details), so automatic retransmission may be kept for the C2M side.

M2C Dataflow—Data Insertion Overview

Data insertion is an M2C feature meant to inject error messages in response to having rejected C2M messages. Client notification of rejected messages is an important feature, as the client side server needs to know the state of the order sent to the market. If the client fails to receive notification of their order, it can typically result in cancel storms or algorithm confusion on the client side.

The M2C Error Injection Packets may include a number of fields, to identify the packet as containing an M2C notification message, an identifier for the message to which the rejection was applied (such as a Client Order ID), an error mask indicating the reason why the message was rejected, and/or a market protocol specific field that depends on a higher level protocol in use between the client and the market devices (such as FIX).

The M2C Error Insertion module is called after C2M data deletion is performed. M2C Error Insertion adds an M2C error message to the payload. This M2C error message will notify the client of the specific message that was rejected by using the rejected Client Order ID in the Market Protocol Specific Message Reject.

One M2C error message for every reject should be created. If a single packet has multiple rejects, the M2C error packet will have one (1) error message per reject. The length of each error message should preferably be less than the size of the killed message. This allows for multiple M2C error messages to be concatenated into a single packet, and avoids the risk of creating an M2C error packet that is greater than 1 MTU. As a result, for every packet killed, one and only one M2C error packet needs to be transmitted.

Returning attention to FIG. 7, the functions of the M2C Data Insertion Packet Constructor Module are now described in more detail.

The M2C Error Transmission function is called right after the C2M modified packet is transmitted. The function does the following:

Recalculates the IP header length of the packet to make sure the injected bytes are included.

Sets a new IP header ID. This ID helps to identify a fragmented packet in a TCP stack. Inserting a random ID avoids the possibility that logic on the receiving side interprets that this error injection is part of a fragmented packet.

Sets the necessary values/bits in the DMA header and in the DMA call, see below for value descriptions:

Raw/Transform bit in DMA header—Sets this DMA header bit to 1 so the hardware recalculates the TCP checksum, CRC, and TCP sequence.

signed 12 bit Delta in DMA header—Sets the delta in the DMA header to communicate the number of bytes modified in the packet (positive delta signals bytes were added, negative signals bytes were subtracted). The FPGA uses this value to update its hardware Delta register for the identified CAM.

unsigned 32 bit Sequence Marker—Sets the Sequence Marker to a value based on the starting TCP sequence of the modified packet being transmitted. This is used to spring the "mousetrap" upon ACK of the modified packet.

Unsigned 32 bit CAM entry—Sets the CAM value for the packet to be DMAed out. This tells the FPGA a) proper TCP sequence to use when it touches up the packet and b) the Delta/Accumulator to update with the new values.

M2C Connection Stall clear bit in DMA header—Sets this DMA header bit to 1 so it clears the M2C Connection Stall. The M2C direction is placed into Connection Stall mode when the first killed message is detected in the C2M data deletion module.

Tracks for M2C fragmented states. Once a packet is killed, software will set the M2C direction into Connection Stall mode. It then processes Connection Stalled M2C packets until it detects that the M2C direction is no longer in a fragmented state. If the connection's M2C direction is in between two fragmented packets, then the M2C error packet cannot be injected into the TCP stream. As a result, the M2C Error Transmission function should continue to process M2C packets until it is no longer in a fragmented state. All M2C error packets are stored in a queue. Once it is confirmed the M2C direction is not in a fragmented state, all packets in the queue can be transmitted.

After the packet is transmitted the CONN_M2C_MOD_PENDING boolean is set.

M2C Error Replay

If the client disconnects from the session while M2C Error Packets are being sent to them, there is a chance that they could miss some injection messages. Lazy ACK Checking only retransmits packets on the same connection. Once the client reconnects, the client needs a way to replay lost M2C Error Messages from the Inspection Device.

In order to handle this, a number, such as the last 1000, of M2C Error Injections, may be replayed to the client at the start of any new connection. These injections will be sent right after a Login Accept is DMAed out to the client and the CAM is elaborated. M2C packets will remain stalled until all injections have been replayed. Because the client should only miss M2C error injections as a result of a disconnect, M2C Error Replay will only occur upon a login after a reconnection.

This feature can be disabled by setting a "replay off" account level permission to true.

Note that the M2C Error Replay is different than market replay. Market replay is a replay of messages sent by the market to the client. M2C Error Replay is a replay of messages injected by the Inspection Device into the M2C TCP stream.

M2C Return to Sender

M2C Return to Sender mode is a feature where M2C error packets are placed back into the ring by the FPGA. After an M2C error packet is transmitted, the FPGA copies the packet into the ring. This allows the datapath to:

parse the packet;

determine what sequence the packet was inserted into the M2C TCP stream; and report a message reject in a log.

M2C Lazy ACK Checking

M2C Lazy ACK Checking is designed with the same architecture as C2M Lazy ACK Checking. There are two modules:

One module that checks C2M ACKs to see if the injected M2C error packet has been ACKed. This check occurs in the connection state machine in the CONN_ACTIVE state if the CONN_M2C_MOD_PENDING boolean is set.

A second module that is its own separate process or thread. This separate process or thread tracks a 10 ms timeout for all connection objects with CONN_M2C_MOD_PENDING set. At 10 ms, it retransmits the M2C error packet. At 100 ms, it disconnects the session.

C2M DSM Hardware Detail and Interface to PTRS Software

Figure 9:
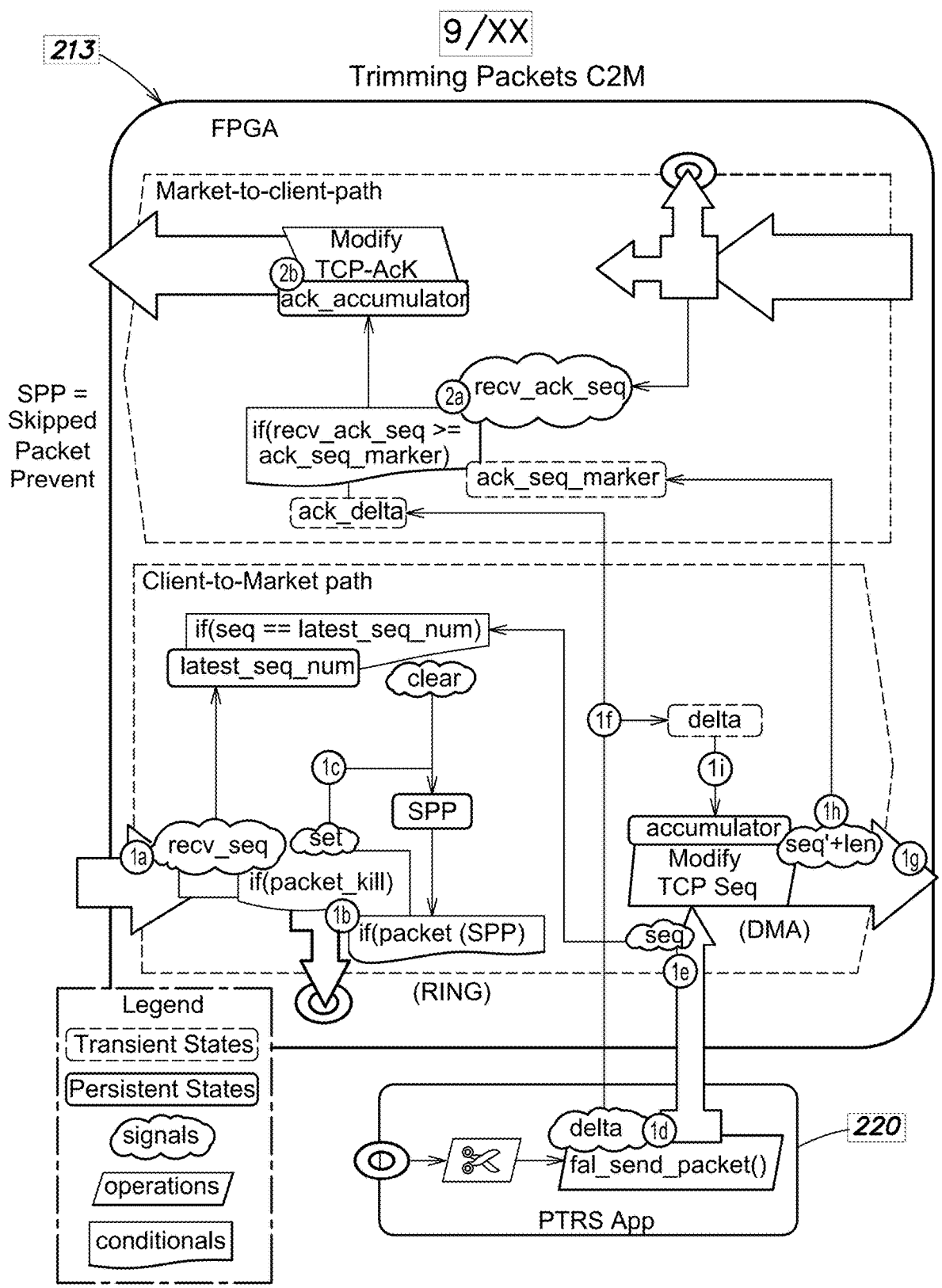
FIG. 9 is a detailed sequence diagram for trimming packets in a Client to Market (C2M) direction.

FIG. 9 illustrates the Fixed Logic (FPGA) 213 hardware and its operation with the data path and with the PTRS Application 220 software. FIG. 9 shows additional detail for handling a situation where the client sends out an erroneous packet. As explained previously, the packet is processed by packet inspection engine where the error is detected, and the packet is marked as a rejected packet. The packet is then sent to the PTRS software 220 for additional processing and retransmission.

Processing is as follows for the Client to Market (C2M) Direction:

(1a) The packet inspection engine (PIE) 420 processes TCP/IP headers of each packet, identifying its session (for example, by using the packet's source IP address and port and destination IP address and port), and extracting its TCP sequence number. Per-session latest_seq_num registers used for tracking the highest TCP seq value for every identified session are updated.

(1b) The PIE rejects the packet, preventing it from completing the cut-through path of the FPGA 213 to the market 130. The packet is forwarded to PTRS Application 220 software (for example, through the ring buffer) marked with proper kill reason in the DMA header.

(1c) The Per-session Skipped Packet prevention mode is set for the session associated with the rejected packet. Until the skipped packet mode is cleared, any future packets of that particular session will be blocked from passing through the FPGA 213 and sent to software 220 for transmission. This may involve, for example, sending information associated with the packets to a processing queue, ring buffer, or other suitable memory or storage shared between the FPGA 213 and software 220. In some embodiments, a counter may be incremented for each packet being set to software 220 due to Skipped Packet prevention mode. As software 220 processes information associated with a packet that was sent to software 220 due to Skipped Packet prevention mode being set, software 220 may decrement the counter. Processing the information associated with the packet may include transmitting the packet (or a modified packet, if the original packet requires modification due to not complying with a rule). In preferred implementations, Skipped Packet prevention mode may be cleared when the counter associated with the packets being sent to software 220 has been cleared. Other embodiments may determine in other suitable ways whether all the information associated with packets being sent to software 220 has been processed. For example, some embodiments may use a pair of pointers or indexes rather than a counter.

(1d) Software processes the rejected packet, and trims (cuts out) the rejected content. The remaining non-rejected content of the packet is then DMA-ed out back to the FPGA. DMA operation may consist of first writing the packet payload into shared memory, followed by programming certain registers in the FPGA 213. This prompts the FPGA 213 to perform a read to the shared memory, to retrieve the payload to be sent to the market. A DMA command register may contain a new field, "delta", which corresponds to the size of the modified (trimmed out) content.

(1e) The TCP sequence number (seq) of the DMA-ed packet is extracted in the FPGA 213. and used in determining whether the skipped packet mode should be cleared for the corresponding session.

(1f) The delta value written in the DMA command register is be applied to the per-flow TCP accumulator and ack_accumulator, used for adjusting TCP sequence number of C2M traffic, and TCP ACK number of M2C traffic. However, both of the accumulator states should remain in original state until the affecting packet passes through their path.

(1g) The affecting packet has its TCP sequencing adjusted according to the value held in the accumulator (before delta makes adjustments to the accumulator). The modified packet is sent to its network destination.

(1h) A pending ACK number is calculated for the DMA-ed out packet, and copied to ack_seq_marker in M2C path. In M2C path, ack_seq_marker triggers application of ack_delta to the ack_accumulator.

(1i) After the packet is sent out to the market, the delta is applied to the accumulator.

It should be understood that the above is but one example implementation of the FPGA 213 (Fixed Logic) hardware, and that variations are possible. For example, although two accumulators are shown (the accumulator in the C2M path and the ack_accumulator in the M2C path) those two accumulators may be replaced with a single accumulator. As an example, a second accumulator and delta register could be avoided by delaying application of the value in the delta register into the accumulator until after the modified packet has been acknowledged by the market. The adjustment of sequence numbers for subsequent packets traveling in the C2M direction would then include the value in the accumulator as well as the value in the delta register.

Processing is as follows for messages flowing in the Market to Client (M2C) direction.

(2a) The recv_ack_seq number of each arriving packet is extracted, and its session identified. If the flow of this particular packet has a pending ack_seq_marker and the recv_ack_seq equals to or is greater than the ack_seq_marker, the pending per-flow ack_delta is applied to the ack_accumulator.

(2b) The ack_accumulator is used for adjusting the ACK number of the passing M2C packet.

M2C DSM in Hardware

Figure 10:
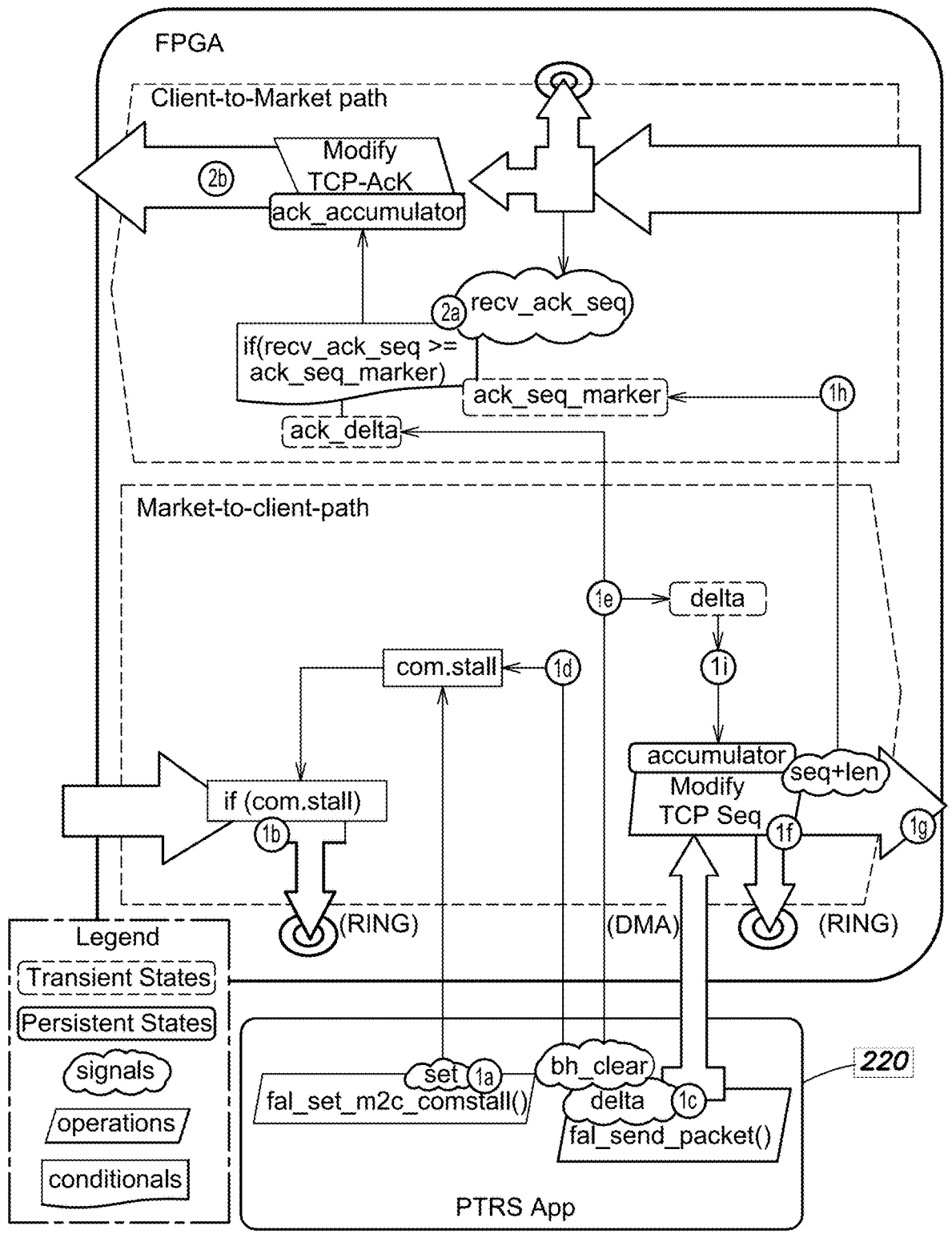
FIG. 10 is a detailed sequence diagram for injecting packets in a Market to Client (M2C) direction.

FIG. 10 illustrates M2C reject message processing. The PTRS Application 220 software recently rejected a message, and preferably then injects the corresponding Notification message back to the client notifying them of the event, and optionally, a reason for the reject. To do this cleanly, the software 220 sets the affected session into an M2C Connection Stall mode, causing all the traffic for that session to be blocked from passing through the FPGA 213. The software 220 will transmit the intercepted traffic to the market 130 via DMA, and will inject the reject message at a clean boundary.

(1a) First, the PTRS Application 220 software sets M2C Connection Stall mode for the session (flow) for which it will inject the reject message.

(1b) A packet received from the market 130 is processed in the FPGA 213, identifying its session (for example, by using the packet's source IP address and port and destination IP address and port). If the packet is identified to belong to a session which is set in Connection Stall mode, the FPGA 213 rejects the packet from reaching the client via a cut-thru path, and sends it to the ring buffer for software transmission.

(1c) PTRS Application 220 software processes incoming M2C traffic on the ring. Upon processing a packet killed for Connection Stall, the software injects a pending reject message into the packet and DMA's it out through the FPGA 213. The PTRS software 220 clears the Connection Stall mode of the affected session (a bh_clear_bit).

(1d) The Connection Stall mode is cleared during transmission of the DMAed out packet.

(1e) The delta value written in DMA_CMD will be applied to the per-flow TCP accumulator and ack_accumulator, and used for adjusting TCP sequence number of M2C traffic, and for adjusting the TCP ACK number of C2M traffic. However, both of the accumulator states should remain in original state until the affecting packet passes through their path.

(1f) The modified packet comprising the injected message is sent to the ring (or other buffer). This is done so that the reject message appears on M2C ring for replays.

(1g) The modified packet has its TCP sequencing adjusted according to the value held in the accumulator (before delta is used for adjustments to the accumulator). The modified Ethernet packet is sent to its network destination.

(1h) A pending ACK number is calculated for the DMA-ed out packet, and copied to ack_seq_marker in C2M path. In C2M path, ack_seq_marker triggers application of ack_delta to the ack_accumulator.

(1i) After the packet is sent out to the market 130, the delta is applied to the accumulator.

2. Client 120 sends traffic to the market 130.

(2a) The recv_ack_seq number of each arriving packet is extracted, and its session identified. If the session of this particular packet has a pending ack_seq_marker and the recv_ack_seq equals to or is greater than the ack_seq_marker, the pending per-flow ack_delta is applied to the ack_accumulator.

(2b) The ack_accumulator is used for adjusting the ACK number of the passing C2M packets.

Pre-Modification PAST Packets Mode

A pre-modification past packet is a packet that has been retransmitted by the client or market side and cannot have its TCP sequence updated in the usual way by the FPGA. This may occur when the retransmission is so far back in the TCP sequence, the most recent Accumulator and Delta no longer accurately reflect the proper sequence modification. As a result, actions should be taken to prevent TCP dysfunctionality.

Figure 11:
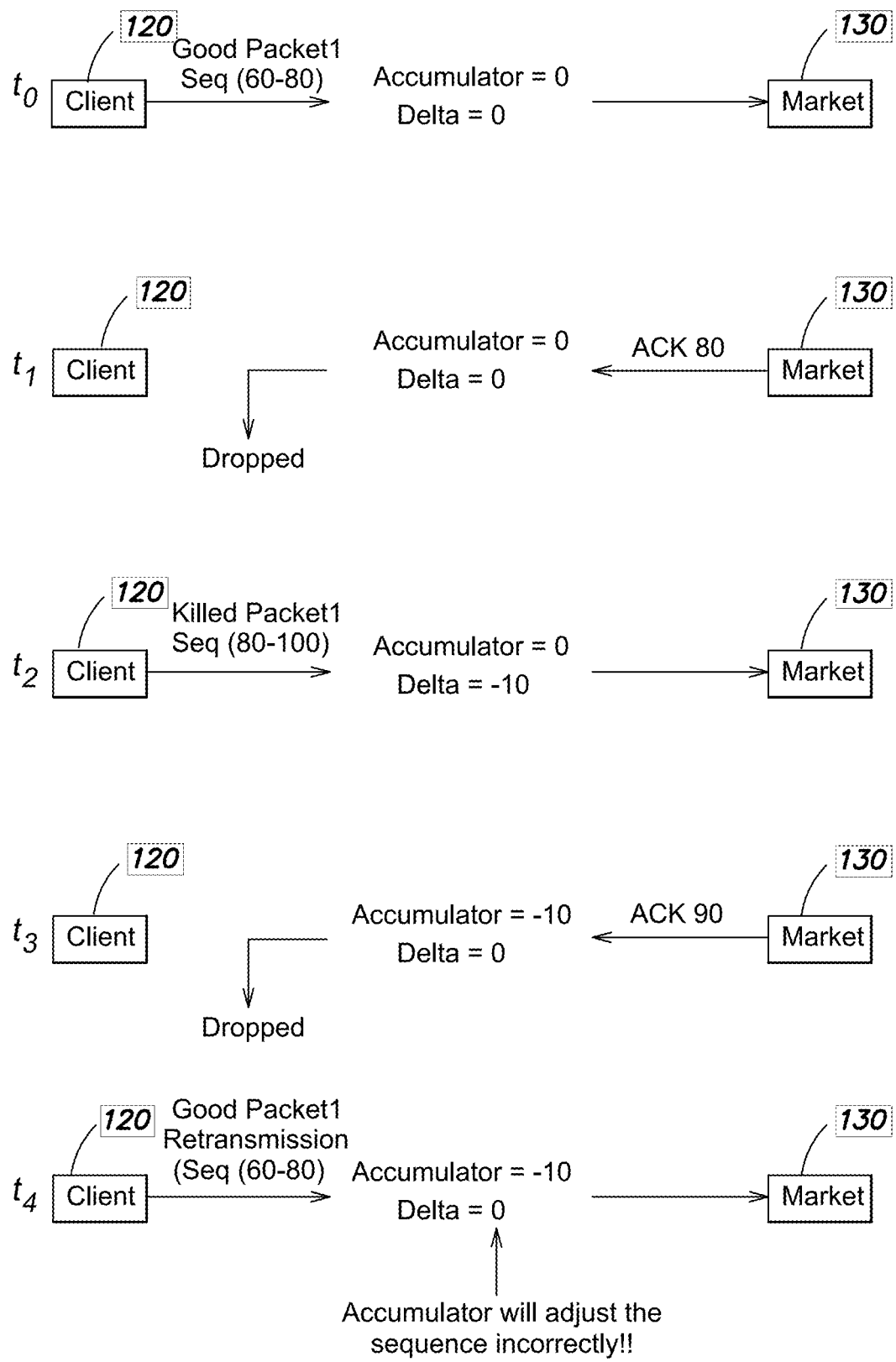
FIG. 11 shows a dropped packet scenario.

FIG. 11 is an example illustrating the problem of the Pre-modification PAST packets condition.

As a setup to the problem, at time t0, Good Packet1 is transmitted on through to the Market. We can see that at time t1, however, the ACK for GoodPacket1 is dropped between the Inspection Device 110 and the Client 120, so the Client 120 does not receive the ACK for GoodPacket1 in an expected time frame. The next C2M packet, KilledPacket1, at time t2, is killed by the Inspection Device 110, resulting in a non-zero delta value ('−10' in this example) being set to account for the change in byte count. The ACK for Killed-Packet1 is observed by the Inspection Device 110 at time t3, but like the ACK for GoodPacket1, is also dropped between the Inspection Device 110 and the Client. Because the ACK for KilledPacket1 was already seen by the Inspection Device 110, the delta value of '−10' is added to the Accumulator.

The problem reveals itself at step t4, when the Client, having not received an ACK for GoodPacket1 in the expected time frame, retransmits GoodPacket1 to the Market. However the Accumulator was set to the wrong value for that sequence. This will cause the retransmitted Good-Packet1 to have its sequence number modified with that wrong accumulator value, causing potential TCP dysfunctionality on the market side. Thus, once a packet has been killed, subsequent packets will have their sequence numbers adjusted by the accumulator. However, as can be seen from this example, it is possible that an older packet that has a sequence number lower than the killed packet arrives late at the Inspection Device 110, after the killed packet arrives.

Pre-modification past packets can occur on either the client side or market side. Detection for this condition occurs in the connection state machine. To avoid TCP dysfunctionality that can result from this condition, a Pre-modification past packets condition can be detected if 1) the TCP sequence number for this packet is less than the most recent sequence marker (CONN_SEQ_MARKER) and 2) there is no MOD_PENDING boolean set.

One possible action to take when a pre-modification past packet is detected is to disconnect the session. As another way to properly handle a Pre-modification past packet (that is, a late arriving packet with a lower sequence number than the most recent sequence marker), the FPGA 213 may retain a history table of the delta, accumulator, and sequence number marker values. The correct sequence number for the late arriving packet can therefore be determined by applying from the history table the relevant values for the accumulator and/or delta associated with the sequence marker value appropriate for the late arriving packet.

M2C Error Injection Fragments—In one embodiment, the PTRS software 220 stores M2C error injections until it can be sure that the M2C direction is no longer in a fragmented state. However, other embodiments are possible where fragmented M2C packets can be split along even message boundaries, eliminating the need to stall the M2C direction. By removing M2C fragments upon error injection, quicker transmission of error packets can be carried out.

TCP Sequence Number Interacts with the TCP Sequence Marker.

In some embodiments, when a new message arrives, the Fixed Logic 213 may compare the new message's TCP sequence number with the value in the Sequence Marker register. If the current message TCP sequence number is less than the value of the Sequence Marker, then the message is forwarded without modification. If the current message TCP sequence number is greater than or equal to the value of the Sequence Marker, then the message's TCP sequence number will have the value of the accumulator register added to it.

Skipped Packet Prevention and the Use of the Fast-Path Vs Slow Path

When a packet is killed, the CAM (or more generally, the inspection device 110) is set into a skipped packet prevention mode. Skipped packet prevention mode sends all client to market (C2M) packets to software, without first being processed by the Fixed Hardware 213.

Figure 12:
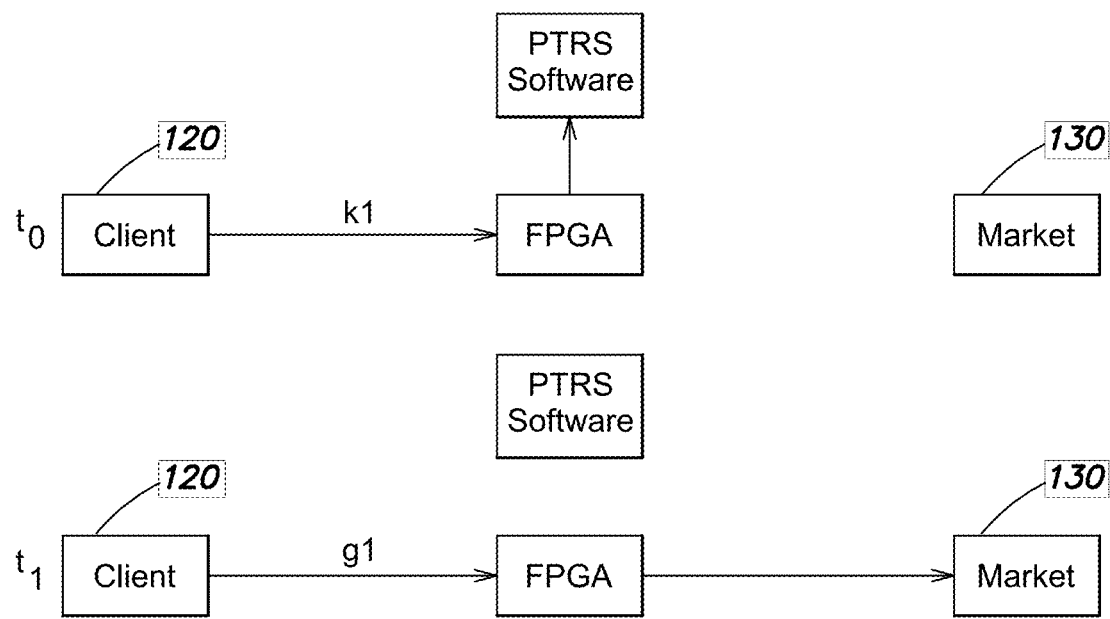
FIG. 12 exhibits a problem that may arise when modifying packets.

This avoids certain race conditions—one such race condition is shown in FIG. 12.

In this case shown in FIG. 12, a Killed Packet1 (k1) was sent at time t0. However at a later time t1, a Good Packet (g) passes through the hardware (FPGA) with need to be processed by the PTRS Application Software 220, and before Software (PTRS Application 220) has time to process the Killed packet1 (k1). This means that Good Packet1 (g1) could arrive at the market before Killed Packet1 (k1) has time to be overwritten. Also, the sequence number for GoodPacket1 could be incorrect, as it would not accurately reflect modification needed due to fully processing Killed-Packet1.

In order to avoid a race condition like this, in the Skipped Packet prevention mode, all packets are sent to software until the last packet that is sent to software has been transmitted. Thus at time t2, if the skipped packet feature is enabled, the FPGA automatically handles skipped packet on its own, and it does not need to be turned on and off by software.

Figure 13:
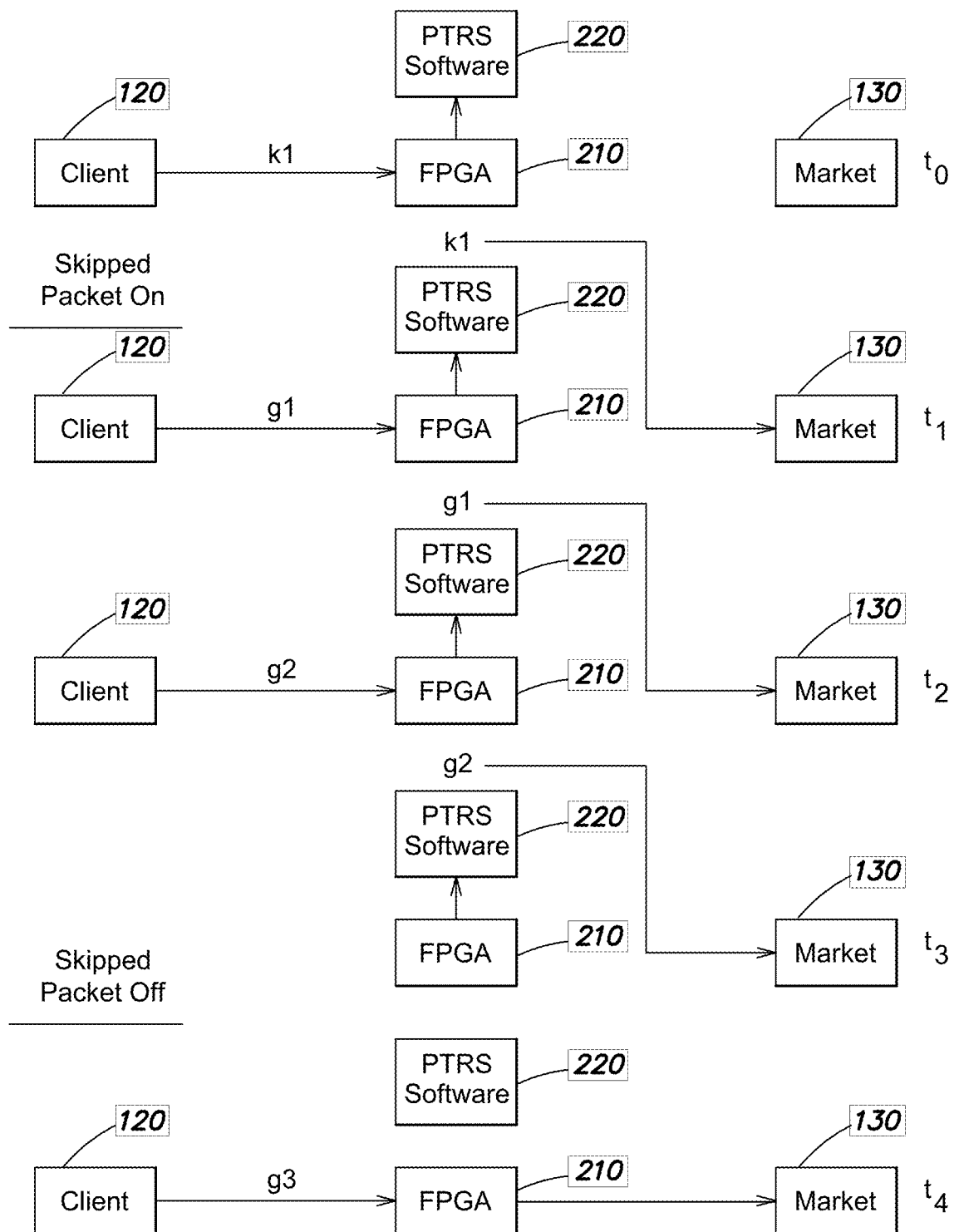
FIG. 13 shows a scenario in which a possible solution has been implemented to the problem illustrated in FIG. 12.

FIG. 13 shows an example of this. At time t0, when the first packet k1 is killed, all following packets such as those received at time t1 and t2, are sent to the PTRS software instead of the FPGA. This continues until the final good packet sent to software, g2, is transmitted at time t3. Skipped packet mode is then switched off, and good packet g3 at time t4 can then now be forwarded through hardware without having to go through software as previously.

Close Proximity Modification (CPM)

A Close Proximity Modification (CPM) is a race condition which occurs when an ACK for a killed packet has not yet been received from the market while another killed packet is waiting to be transmitted. In this case, the Delta is still storing the total removed bytes from the original killed packet, and it can't be added to the Accumulator or cleared until the ACK for that packet arrives. When a CPM occurs, the second killed packet should be stalled before it can be transmitted. Once the ACK for the first killed packet is received, the second killed packet can be transmitted. In some embodiments, rather than stalling, it may be possible to queue up subsequently killed packets.

Figure 14:
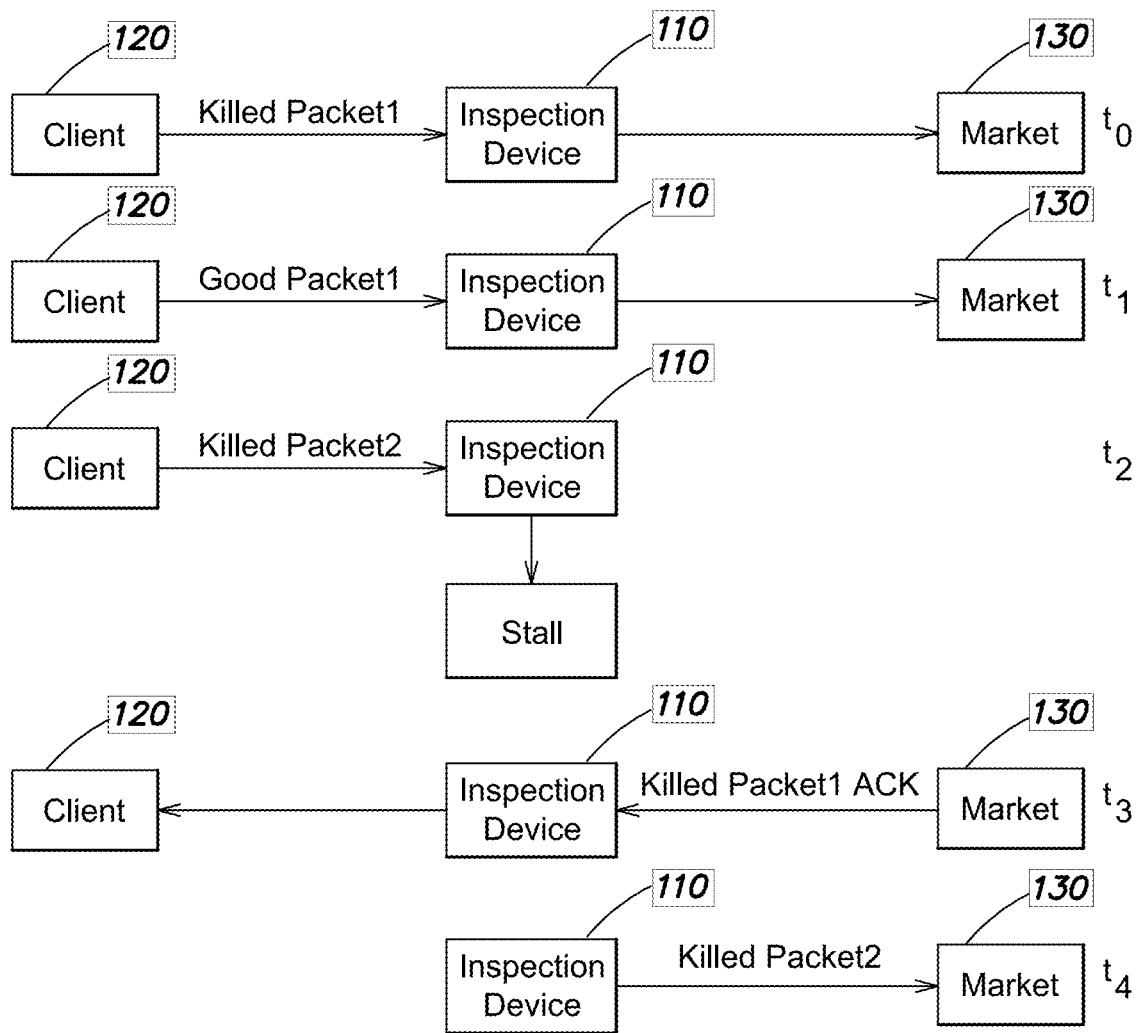
FIG. 14 exhibits a scenario showing a different problem that may arise when modifying packets.

FIG. 14 shows a Close Proximity Modification (CPM) scenario.

If the CONN_C2M_MOD_PENDING boolean is already set (at time t0) while a killed C2M packet is being transmitted, the C2M transmission module does the following:
1) Stalls the entire core once the condition is detected, such as time t2. Here a subsequent received Killed Packet2 will be stalled in the Inspection Device. (Note that the Close Proximity condition was detected when a KilledPacket2 is received at time t2 in close proximity to the KilledPacket1 (i.e., before an ACK has been received for KilledPacket1). Good Packet 1 at time t1 will be handled by the hardware and sent to the market, but subsequent packets should be stalled until an ACK is received for KilledPacket1).
2) Constantly polls the Delta register for the session the CPM has occurred on:
   Once the Delta register is 0, at time t3, then the ACK for the first killed packet1 has been received. At this point, the stall can be released and the second killed packet2 can be transmitted at time t4.
   If the Delta register is still non-zero:
   Retransmit the last modified packet (e.g., KilledPacket1 in this example) at a fixed interval, for example, every 10 ms.
   If an ACK for the last modified packet is still not received after a timeout period (for example, 100 ms), disconnect the session.

At the moment, it is assumed that CPMs should be a very rare case while trading is active on the Inspection Device 110. For this reason, the entire core can be stalled on detection of a CPM.

It is important to note the method of handling the CPM outlined above uses software when the number of CPMs exceed the number of Sequence Marker Registers in hardware. In some embodiments, there could exist multiple Sequence Marker, Delta, and accumulator registers to accommodate multiple CPMs on the hardware path. For example, an embodiment with three sets of Sequence Marker, Delta, and accumulator registers can accommodate three outstanding unacknowledged modified packets at a time. In such an example embodiment, when a second packet needs to be modified even though an acknowledgment has not yet been received for a first modified packet, a delta value, Sequence Marker, and/or accumulator value corresponding to the second modified packet may be stored in a second set of registers. Similarly, a third packet needing modification prior to the first two modified packets' being acknowledged would result in storing a delta value, Sequence Marker, and/or accumulator value into a third set of registers. A fourth packet needing modification before the prior three modified packets have been acknowledged may then be handled by software, or stalled, as described above. Thus, such embodiments avoid stalling when a packet needing modification arrives as long as a set of Sequence Marker, Delta, and/or Accumulator registers remains available to associate with the newly arrived packet needing modification. When an acknowledgement is received for a modified packet associated with a set of Sequence Marker, Delta, and/or Accumulator registers, the values in the registers associated with the acknowledged modified packet may be cleared and made available for reuse by another incoming packed needing modification.

Instances of Hardware Mechanisms Per Duplex Session.

There exist separate instance pairs of the hardware mechanism described in this document per session. One instance of the pair handles the TCP session's C2M direction, the other instance handles the TCP session's M2C direction. A typical FPGA will support 128 sessions (256 instances of this mechanism) in practice, however that actual number is arbitrary and only limited to the memory on the FPGA chip.

Options to Modify TCP Packets

The technology described in this document will allow for a cut-through ultra-low latency device to completely remove a message from an established TCP stream, replace an existing message "in-flight" message with that of a different size, or inject additional messages in either C2M or M2C directions.

Synthesizing Market Rejection Messages The technology described in this document will accommodate removal, addition, and modification of messages in an existing TCP stream. These lower level mechanisms are utilized to remove trading event messages that fail risk checks and will prevent data from arriving at the target trading venue. Additionally, the client that had their trading message rejected will require a rejection notification so they know their message was not received by the venue. This technology will synthesize a protocol specific reject message such that the clients trading server that is already coded to the trading venue protocol can interpret the reject seamlessly. The end result will appear to the trading client like the trading venue rejected the message for violation of a pre-trade risk control. Furthermore, the system will add additional information regarding specific reject reasons so the client can interpret exactly why the original trading message was rejected.

FPGA Ring Buffer

In some implementations, one primary communication mechanism between the FPGA (Fixed Hardware) 213 and PTRS software 220 may be a ring buffer. This ring buffer is maintained by two pointers: the head pointer and the tail pointer. The FPGA 213 writes all data to the buffer starting at the location of the tail pointer. Once the FPGA 213 completes the write of data, it will advance the tail pointer to the memory location of the last byte written. When software reads from the buffer, the head pointer is advanced to the location of the last byte read such that the memory can be safely overwritten by the FPGA 213. The head and tail pointers that track the start and end memory locations of valid data "wrap" from the base address of the ring buffer to the (base address plus buffer size), therefore creating a "circular ring". Considerations are taken to prevent the FPGA 213 from overflowing the ring buffer which would cause the tail pointer to overwrite beyond the head pointer after a "wrap" event occurs.

Other Use Cases

The architecture described above may be of use in other applications. For example, it is possible that it may be used to monitor data streams flowing across a network, capture packets, decode the packets' raw data, and analyze packet content in real time for reasons other than inspecting securities trade orders.

Further Implementation Options

It should be understood that the example embodiments described above may be implemented in many different ways. In some instances, the various "data processors" may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices. Network interface(s) allow connections to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); storage including magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

Therefore, while this description has been particularly shown and described with references to example embodiments thereof, it will be understood by those skilled in the art that various changes in form and details may be made therein without departing from the scope of the invention as encompassed by the appended claims.

The invention claimed is:

1. A method comprising:
   during a duplex networked session established between a first endpoint and a second endpoint,
   inspecting a stream of packets; and
   upon determining that a message within a selected packet received from the first endpoint is to be modified,
   modifying the message in the selected packet to generate a modified packet;
   sending the modified packet to the second endpoint;
   sending a reply message to the first endpoint, the reply message comprising a reply packet including a value that depends on a reason that the message was modified;
   determining a modified packet sequence number to account for modifying the message, by further:
   maintaining an accumulator value;
   storing a delta value representing a difference in byte count between the selected packet and the modified packet;
   detecting an acknowledgement of the modified packet from the second endpoint; and
   modifying the accumulator value based on the delta value.

2. The method of claim 1 additionally comprising:
   determining a modified reply packet sequence number by:
   maintaining a second accumulator value;
   storing a second delta value that depends on a byte count of the reply message;
   detecting an acknowledgement of the reply packet from the first endpoint; and
   modifying the second accumulator value based on the second delta value.

3. The method of claim 2 additionally comprising:
   storing as a per-session sequence marker a value based on the sequence number of the selected packet;
   if a subsequent arriving acknowledgement packet from the second endpoint has an acknowledgement (ACK) sequence number equal to or greater than the per-session sequence marker, then
   applying the delta value to the accumulator;
   adjusting the ACK sequence number of the subsequent arriving packet from the second endpoint by the value of the accumulator associated with the session; and
   delaying acknowledgement of the subsequent arriving packet.

4. The method of claim 3 wherein the per-session sequence marker is a value based on a sequence number and a length of a previous modified packet additionally comprising:
   setting a mod pending value to a true state while the acknowledgement for the modified packet has not been received from the second endpoint; and detecting a pre-modification condition occurring when a sequence number for a subsequent arriving packet from the first endpoint is less than the sequence marker value and the mod pending value is not set to the true state; and then either:
  (a) disconnecting the session; or
  (b) determining a sequence number for the subsequent arriving packet from a stored history of accumulator, delta and sequence marker values.

5. The method of claim 1 additionally comprising:
detecting when the acknowledgement of the modified packet from the second endpoint has not yet been received before a second message received from the first endpoint needs to be modified; and
stalling sending of a modified second message to the second endpoint until an acknowledgment of the modified packet is received from the second endpoint.

6. The method of claim 1 wherein two or more messages need to be modified, and the step of determining a modified sequence number additionally comprises:
maintaining a plurality of corresponding accumulator values, each associated with a message within one or more selected packets that needs to be modified to generate one or more modified packets;
storing a corresponding plurality of delta values representing differences in byte count between the one or more selected packets and corresponding ones of the one or more modified packets;
detecting a corresponding acknowledgement for the one or more modified packets from the second endpoint separately from detecting acknowledgement of at least one other modified packet; and
modifying the corresponding accumulator value based on the corresponding delta value.

7. The method of claim 6 additionally comprising:
storing a plurality of per-session sequence marker values, each based on a sequence number of the one or more selected packets;
if a subsequent arriving acknowledgement packet from the second endpoint has an acknowledgement (ACK) sequence number equal to or greater than a corresponding per-session sequence marker value, then
  applying the delta value to the corresponding accumulator; and
  adjusting the corresponding ACK sequence number of the subsequent arriving corresponding packet from the second endpoint by the corresponding accumulator value associated with the session.

8. The method of claim 1 additionally comprising:
storing a plurality of reply messages that indicate reasons that one or more corresponding messages were modified; and
detecting reestablishment of a duplexed network session with a first endpoint; and
resending the plurality of reply messages to the first endpoint.

9. The method of claim 1 additionally comprising:
maintaining an acknowledgement accumulator value;
storing an acknowledgement delta value; and
modifying the acknowledgement accumulator value based on the acknowledgement delta value.

10. The method of claim 1 additionally comprising:
while in a fragmented state during which an other message received from the second endpoint has not yet been completely forwarded to the first endpoint:
  queuing the reply message; and
  delaying the sending of the reply message until after the other message is completely forwarded to the first endpoint.

11. The method of claim 1 additionally comprising:
delaying transmission of one or more subsequent packets to the second endpoint until after the step of sending the modified packet to the second endpoint.

12. The method of claim 11 wherein the step of delaying transmission further comprises continuing to delay transmission of one or more subsequent packets as long as either:
the modified packet is still being processed; or
another subsequent packet is still being processed.

13. The method of claim 12 additionally comprising:
storing a latest sequence number value that depends on a sequence number for a modified packet that has not yet been sent.

14. The method of claim 1 additionally comprising:
using fixed logic to perform the steps of inspecting the stream of packets and determining that the message needs to be modified; and
accessing a Direct Memory Access (DMA) buffer to generate the modified packet, including, in a DMA header, the value that depends on a reason the message was modified, and including, in a DMA command register, the delta value.

15. An apparatus comprising:
one or more interfaces configured to establish a duplex networked session between a first endpoint and a second endpoint,
a packet inspection device configured to
  inspect a stream of packets, to determine that a message within a selected packet received from the first endpoint is to be modified, and to further:
    modify the message in the selected packet to generate a modified packet;
    send the modified packet to the second endpoint via the one or more interfaces;
    send a reply message to the first endpoint via the one or more interfaces, the reply message comprising a reply packet including a value that depends on a reason that the message was modified;
    maintain an accumulator value;
    store a delta value representing a difference in byte count between the selected packet and the modified packet;
    detect an acknowledgement of the modified packet from the second endpoint;
    modify the accumulator value based on the delta value; and
    determine a modified sequence number based on the accumulator value.

16. The apparatus of claim 15 wherein the packet inspection device is additionally configured to:
maintain a second accumulator value;
store a second delta value that depends on a byte count of the reply message;
detect an acknowledgement of the reply packet from the first endpoint;
modify the second accumulator value based on the second delta value; and
determine a modified reply packet sequence value based on the second accumulator value.

17. The apparatus of claim 16 wherein the packet inspection device is additionally configured to:
store as a per-session sequence marker a value based on the sequence number of the selected packet;

determine if a subsequent arriving acknowledgement packet from the second endpoint has an acknowledgement (ACK) sequence number equal to or greater than the per-session sequence marker, and if so then:
  apply the delta value to the accumulator;
  adjust the ACK sequence number of the subsequent arriving packet from the second endpoint by the value of the accumulator associated with the session; and
  delay acknowledgement of the subsequent arriving packet.

18. The apparatus of claim 17 wherein the per-session sequence marker is a value based on a sequence number and a length of a previous modified packet, and the packet inspection device is additionally configured to:
  set a mod pending value to a true state while the acknowledgement for the modified packet has not been received from the second endpoint; and
  detect a pre-modification condition occurring when a sequence number for a subsequent arriving packet from the first endpoint is less than the sequence marker value and the mod pending value is not set to the true state; and
  then either:
    (a) disconnect the session; or
    (b) determine a sequence number for the subsequent arriving packet from a stored history of accumulator, delta and sequence marker values.

19. The apparatus of claim 15 wherein the packet inspection device is additionally configured to:
  detect when the acknowledgement of the modified packet from the second endpoint has not yet been received before a second message received from the first endpoint needs to be modified; and
  stall sending of a modified second message to the second endpoint until an acknowledgment of the modified packet is received from the second endpoint.

20. The apparatus of claim 15 wherein the packet inspection device is additionally configured to:
  detect when two or more messages need to be modified;
  maintain a plurality of corresponding accumulator values, each associated with a message within one or more selected packets that needs to be modified to generate one or more modified packets;
  store a corresponding plurality of delta values representing differences in byte count between the one or more selected packets and corresponding ones of the one or more modified packets;
  detect a corresponding acknowledgement for the one or more modified packets from the second endpoint separately from detecting acknowledgement of at least one other modified packet;
  modify the corresponding accumulator value based on the corresponding delta value; and
  thereby determine the modified sequence number based on the plurality of corresponding accumulator values and the corresponding plurality of delta values.

21. The apparatus of claim 20 wherein the packet inspection device is additionally configured to:
  store a plurality of per-session sequence marker values, each based on a sequence number of the one or more selected packets;
  detect if a subsequent arriving acknowledgement packet from the second endpoint has an acknowledgement (ACK) sequence number equal to or greater than a corresponding per-session sequence marker value, and if so then
  apply the delta value to the corresponding accumulator; and
  adjust the corresponding ACK sequence number of the subsequent arriving corresponding packet from the second endpoint by the corresponding accumulator value associated with the session.

22. The apparatus of claim 15 wherein the packet inspection device is additionally configured to:
  store a plurality of reply messages that indicate reasons that one or more corresponding messages were modified; and
  detect reestablishment of a duplexed network session with a first endpoint; and
  resend the plurality of reply messages to the first endpoint.

23. The apparatus of claim 15 wherein the packet inspection device is additionally configured to:
  maintain an acknowledgement accumulator value;
  store an acknowledgement delta value; and
  modify the acknowledgement accumulator value based on the acknowledgement delta value.

24. The apparatus of claim 15 wherein the packet inspection device is additionally configured to:
  while in a fragmented state during which an other message received from the second endpoint has not yet been completely forwarded to the first endpoint:
    queue the reply message; and
    delay sending of the reply message until after the other message is completely forwarded to the first endpoint.

25. The apparatus of claim 15 wherein the packet inspection device is additionally configured to:
  delay transmission of one or more subsequent packets to the second endpoint until after the modified packet is sent to the second endpoint.

26. The apparatus of claim 25 wherein the packet inspection device is additionally configured to:
  delay transmission of one or more subsequent packets as long as either (a) the modified packet is still being processed or (b) another subsequent packet is still being processed.

27. The apparatus of claim 25 wherein the packet inspection device is additionally configured to:
  store a latest sequence number value that depends on a sequence number for a modified packet that has not yet been acknowledged.

28. The apparatus of claim 15 wherein the packet inspection device additionally comprises:
  fixed logic inspect the stream of packets and determine that the message needs to be modified;
  a Direct Memory Access (DMA) buffer configured to generate the modified packet, including, in a DMA header, the value that depends on a reason the message was modified; and
  a DMA command register, configured to store the delta value.

29. An apparatus comprising:
  a packet inspection device, for inspecting a packet stream associated with a duplex network session established between a first endpoint and a second endpoint, and
  upon determining that a message within a selected packet received from the first endpoint contains non-compliant content that does not comply with a rule, for further:
    modifying the message in the selected packet to generate a modified packet;
    determining a modified sequence number to account for modifying the message;

sending the modified packet to the second endpoint; and sending a reply message to the first endpoint, the reply message comprising a reason that the message was modified.

* * * * *

UNITED STATES PATENT AND TRADEMARK OFFICE
CERTIFICATE OF CORRECTION

PATENT NO. : 11,539,819 B2
APPLICATION NO. : 17/037857
DATED : December 27, 2022
INVENTOR(S) : Anthony D. Amicangioli et al.

It is certified that error appears in the above-identified patent and that said Letters Patent is hereby corrected as shown below:

In the Claims

In Column 24, Line 24, replace "message" with --packet--.

In Column 24, Line 25, replace "message" with --packet--.

In Column 24, Line 25, replace "packet" with --message--.

In Column 24, Line 49, replace the first "the" with --a--.

In Column 24, Line 56, after "arriving" insert --acknowledgement--.

In Column 24, Line 57, replace "value of the accumulator associated with the session" with --accumulator value--.

In Column 24, Line 59, after "arriving" insert --acknowledgement--.

In Column 25, Line 3, after the second "the" insert --per-session--.

In Column 25, Line 9, after "packet" insert --from the first endpoint--.

In Column 25, Line 17, replace "an" with --the--.

In Column 25, Line 21, before "sequence" insert --packet--.

In Column 25, Line 44, after the first "the" insert --corresponding--.

In Column 25, Lines 44-45, after "accumulator" insert --value--.

In Column 25, Line 46, delete "corresponding".

Signed and Sealed this
Nineteenth Day of September, 2023

Katherine Kelly Vidal
*Director of the United States Patent and Trademark Office*

CERTIFICATE OF CORRECTION (continued)
U.S. Pat. No. 11,539,819 B2

In Column 25, Line 47, replace "corresponding" with --acknowledgement--.

In Column 25, Line 49, delete "associated with the session".

In Column 25, Line 54, replace "a duplexed network" with --the duplex networked--.

In Column 25, Line 55, replace "a" with --the--.

In Column 26, Line 39, replace "message" with --packet--.

In Column 26, Line 40, replace "message" with --packet--.

In Column 26, Line 41, replace "packet" with --message--.

In Column 26, Line 67, replace the first "the" with --a--.

In Column 27, Line 7, after "arriving" insert --acknowledgement--.

In Column 27, Line 8, replace "value of the accumulator associated with the session" with --accumulator value--.

In Column 27, Line 11, before "packet" insert --acknowledgement--.

In Column 27, Line 21, after the second "the" insert --per-session--.

In Column 27, Line 27, after "packet" insert --from the first endpoint--.

In Column 27, Line 36, replace "an" with --the--.

In Column 28, Line 1, after the first "the" insert --corresponding--.

In Column 28, Line 1, after "accumulator" insert --value--.

In Column 28, Line 3, delete "corresponding".

In Column 28, Line 4, replace "corresponding" with --acknowledgement--.

In Column 28, Line 6, delete "associated with the session".

In Column 28, Line 12, replace "a duplexed network" with --the duplex networked--.

In Column 28, Line 13, replace "a" with --the--.

In Column 28, Line 48, after "logic" insert --to--.